(12) United States Patent
Ohzawa et al.

(10) Patent No.: US 7,457,044 B2
(45) Date of Patent: Nov. 25, 2008

(54) ULTRA WIDE ANGLE IMAGING OPTICAL SYSTEM, ULTRA WIDE ANGLE IMAGING LENS DEVICE, AND IMAGE SENSING APPARATUS

(75) Inventors: Soh Ohzawa, Toyonaka (JP); Masayuki Inoue, Yokkaichi (JP); Masayoshi Imoto, Yokkaichi (JP)

(73) Assignees: Konica Minolta Opto, Inc., Hachioji-Shi, Tokyo (JP); Sumitomo Electric Industries, Ltd., Osaka-Shi, Osaka (JP); AutoNetworks Technologies, Ltd., Yokkaichi-Shi, Mie (JP); Sumitomo Wiring Systems, Ltd., Yokkaichi-Shi, Mie (JP)

( * ) Notice: Subject to any disclaimer, the term of this patent is extended or adjusted under 35 U.S.C. 154(b) by 143 days.

(21) Appl. No.: 11/636,896

(22) Filed: Dec. 11, 2006

(65) Prior Publication Data

US 2007/0133107 A1 Jun. 14, 2007

(30) Foreign Application Priority Data

Dec. 9, 2005 (JP) ............................. 2005-355804

(51) Int. Cl.
G02B 13/08 (2006.01)
G02B 13/04 (2006.01)

(52) U.S. Cl. ....................... 359/671; 359/668; 359/749; 359/750

(58) Field of Classification Search ................. 359/668, 359/671, 749, 750
See application file for complete search history.

(56) References Cited

U.S. PATENT DOCUMENTS 5,668,666 A * 9/1997 Suzuki ........................ 359/674
2004/0196570 A1 10/2004 Nurishi ........................ 359/668
2005/0083427 A1 * 4/2005 Imoto .......................... 348/335
2005/0168829 A1 8/2005 Nurishi et al. ............... 359/668

FOREIGN PATENT DOCUMENTS

| JP | 5-103271 A | 4/1993 |
| JP | 8-62494 A | 3/1996 |
| JP | 2984954 B2 | 10/1999 |
| JP | 2002-258154 A | 9/2002 |
| JP | 2005-300902 A | 10/2005 |

* cited by examiner

Primary Examiner—Scott J Sugarman
(74) Attorney, Agent, or Firm—Buchanan Ingersoll & Rooney PC

(57) ABSTRACT

An ultra wide angle imaging optical system includes, in order from an object side, a first lens group, an aperture stop, and a second lens group. The first lens group includes, in order from the position closest to the object side, a negative meniscus lens element convex to the object side, a negative lens element, and a negative lens element. The second lens group includes a plurality of positive lens elements. The first lens group and the second lens group each includes at least one anamorphic surface having different optical powers with respect to a first section extending in a first direction on a flat plane substantially orthogonal to an optical axis, and with respect to a second section extending in a second direction substantially orthogonal to the first direction. The first lens group includes the lens element satisfying the following conditional formula (1):

$$-0.6 < (Ph-Pv)*(fh+fv) < -0.1 \qquad (1)$$

where
Ph: an optical power in the first direction where a viewing angle is large;
Pv: an optical power in the second direction where the viewing angle is small;
fh: a focal length in the first direction with respect to the entirety of the optical system; and
fv: a focal length in the second direction with respect to the entirety of the optical system.

10 Claims, 16 Drawing Sheets

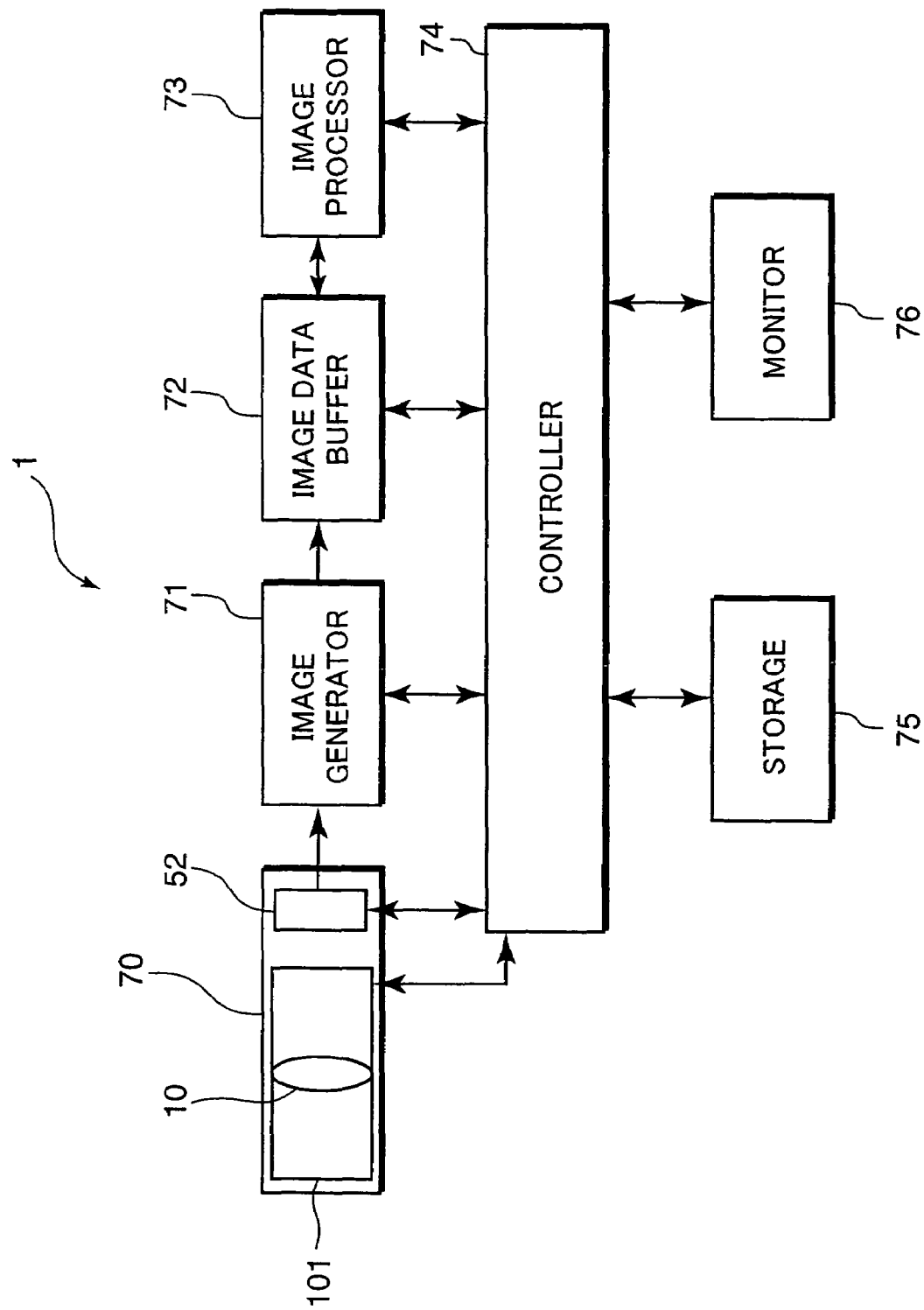

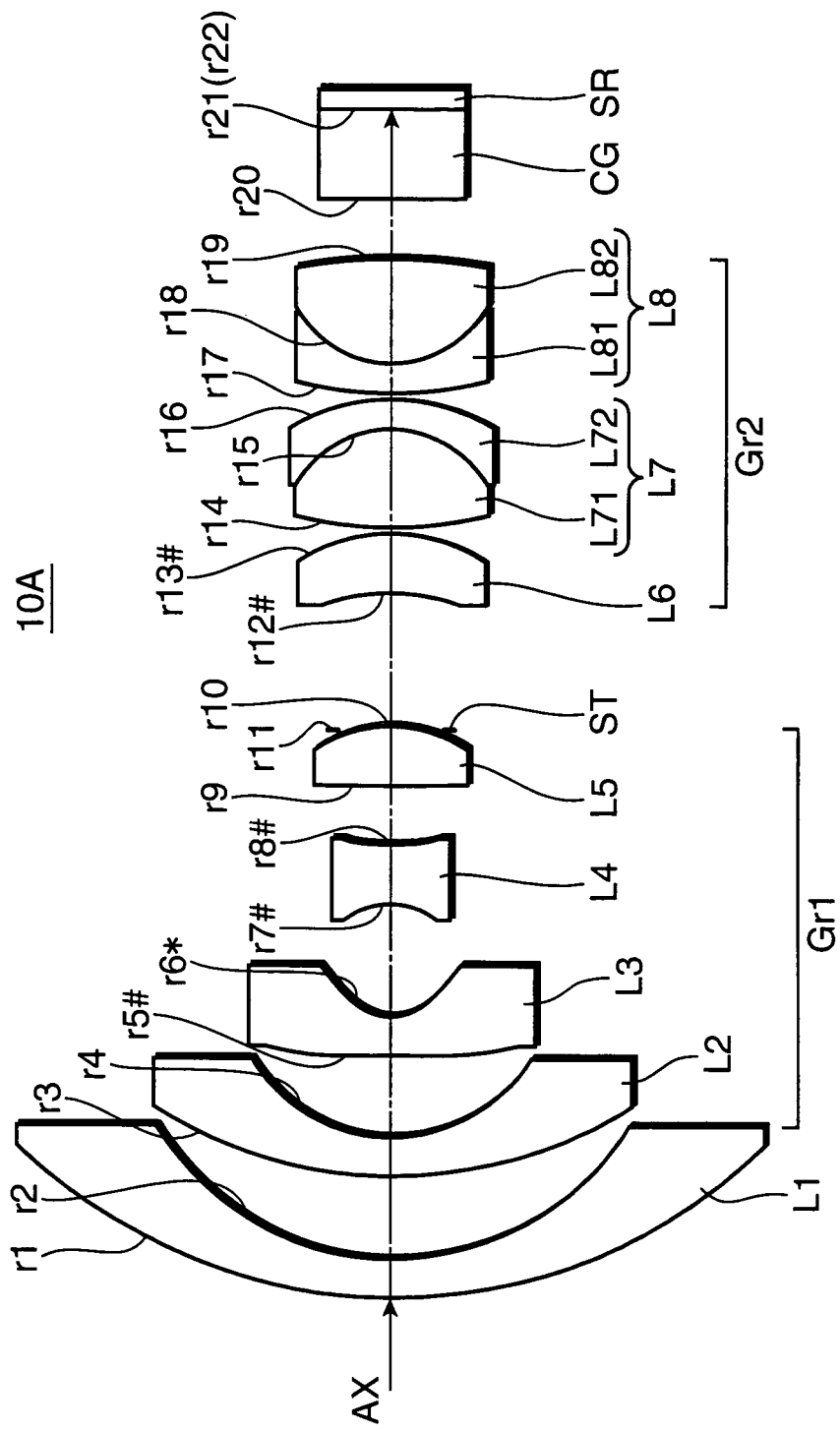

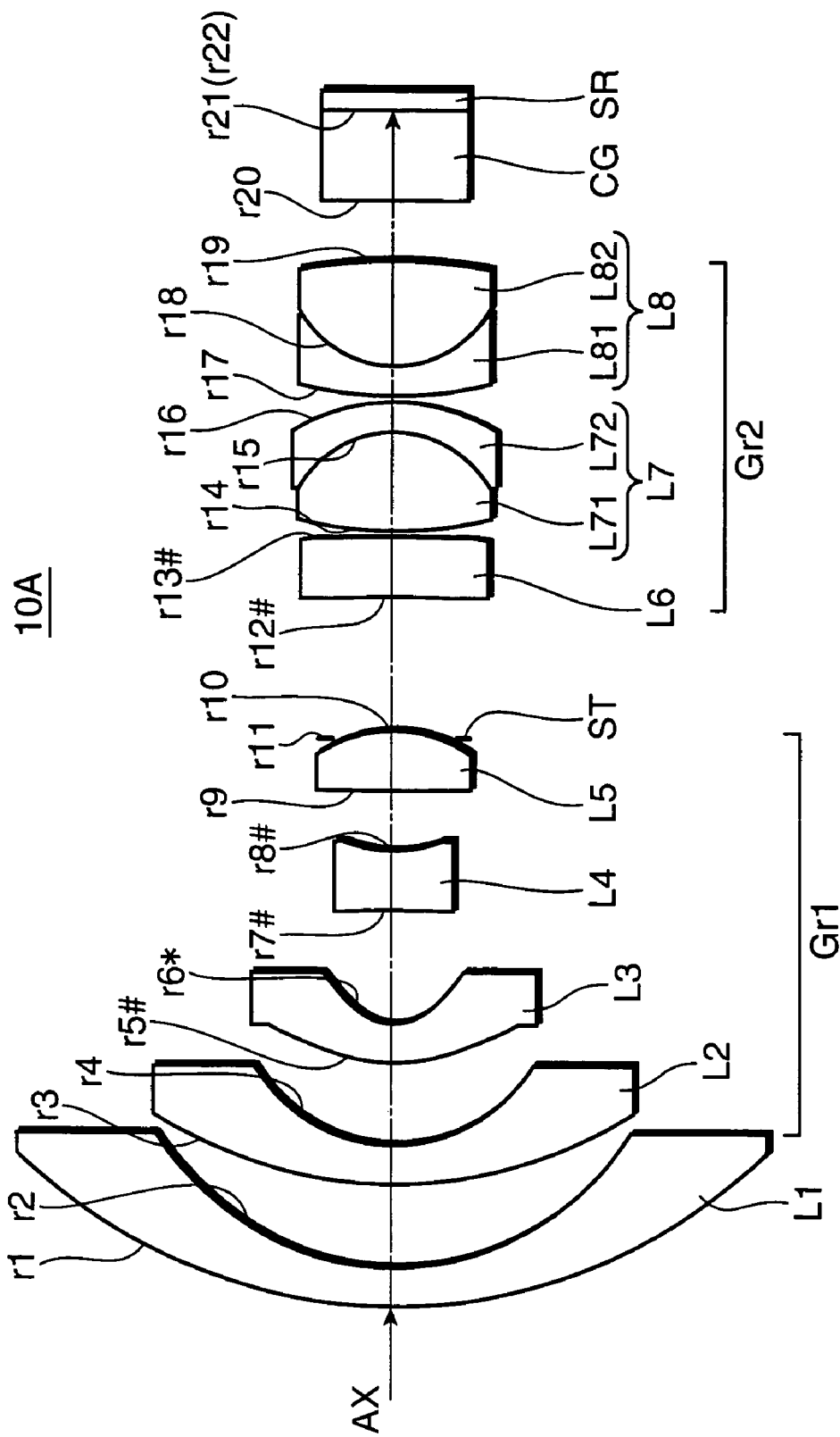

ULTRA WIDE ANGLE IMAGING OPTICAL SYSTEM, ULTRA WIDE ANGLE IMAGING LENS DEVICE, AND IMAGE SENSING APPARATUS

This application is based on Japanese Patent Application No. 2005-355804 filed on Dec. 9, 2005, the contents of which are hereby incorporated by reference.

BACKGROUND OF THE INVENTION

1. Field of the Invention

The present invention relates to an ultra wide angle imaging optical system having an ultra wide angle of e.g. more than 180 degrees as an entire viewing angle in one direction, an ultra wide angle imaging lens device provided with the ultra wide angle imaging optical system, and an image sensing apparatus mounted with the ultra wide angle imaging lens device, such as a car-mounted camera or a security camera.

2. Description of the Related Art

Generally, it is preferable to use an imaging optical system having a wide viewing angle i.e. a wide angle lens in a car-mounted camera to be mounted as a back monitor in an automobile, or in a security camera for monitoring a predetermined monitoring area, or in a like device so as to acquire video information concerning a wider area with a less number of cameras. In the car-mounted camera, however, a wide viewing angle is not required in all directions, but is primarily required in a horizontal direction i.e. a widthwise direction of the automobile. This is because generally a wide area observation is not required in a vertical direction i.e. a height direction of the automobile, and because the car-mounted camera with a wide viewing angle in the vertical direction may capture an image of a high luminance object such as the sun or a street lamp, which may degrade the quality of the monitored image. In car-mounted cameras or security cameras of a recent trend, there is a demand for securing an ultra wide angle of more than 180 degrees, as the entire viewing angle in the horizontal direction.

In the case where a normal fisheye lens arrangement is adopted to realize such an ultra wide angle imaging optical system, the viewing angle in the vertical direction may be unduly increased. As a result, an image distortion resulting from lens distortion may be increased, in addition to the likelihood that a high luminance object image may captured. In view of this, there is proposed an anamorphic optical system having focal lengths or lens distortions different from each other in the horizontal direction as a first direction and in the vertical direction as a second direction. Use of the anamorphic optical system enables to provide an imaging optical system capable of securing an ultra wide angle in the horizontal direction where a wide viewing angle is required, and yet with a relatively less image distortion in the vertical direction. Such an anamorphic optical system is disclosed in e.g. Japanese Patent No. 2,984,954 and Japanese Unexamined Patent Publication No. Hei 8-62494. The publications disclose an arrangement in the field of electronic endoscopes, in which an anamorphic surface is provided in an objective optical system to match the viewing angle of a lens element of the objective optical system with an aspect ratio of a display screen.

The anamorphic optical system disclosed in the publications is constructed in such a manner that a forward lens group as a first lens group, an aperture stop, and a rearward lens group as a second lens group are arranged in order from the object side, and that merely a single negative lens element is provided on the object side of the first lens group. In this arrangement, the production of an ultra wide angle imaging optical system having a viewing angle of more than 180 degrees in a horizontal direction is difficult. Also, since the anamorphic surface is provided on the first lens element having a large lens diameter, the cost relating to formation and processing of the anamorphic surface may be increased.

SUMMARY OF THE INVENTION

In view of the above problems residing in the conventional examples, it is an object of the present invention to provide an ultra wide angle imaging optical system, with an ultra wide viewing angle in a first direction e.g. a horizontal direction, a less viewing angle in a second direction e.g. a vertical direction, and a relatively less image distortion, which enables to suppress an increase in the parts cost, as well as an imaging lens device provided with the ultra wide angle imaging optical system, and an image sensing apparatus mounted with the imaging lens device, such as a car-mounted camera or a security camera.

An aspect of the invention is directed to an ultra wide angle imaging optical system comprising, in order from an object side, a first lens group, an aperture stop, and a second lens group. The first lens group includes, in order from a position closest to the object side, a negative meniscus lens element convex to the object side, a negative lens element, and a negative lens element. The second lens group includes a plurality of positive lens elements. The first lens group and the second lens group each includes at least one anamorphic surface having different optical powers with respect to a first section extending in a first direction on a flat plane substantially orthogonal to an optical axis, and with respect to a second section extending in a second direction substantially orthogonal to the first direction. The first lens group includes the lens element satisfying the following conditional formula (1):

$$-0.6 < (Ph-Pv)*(fh+fv) < -0.1 \qquad (1)$$

where

Ph: an optical power in the first direction where a viewing angle is large;

Pv: an optical power in the second direction where the viewing angle is small;

fh: a focal length in the first direction with respect to the entirety of the optical system; and fv: a focal length in the second direction with respect to the entirety of the optical system.

In the formula, "*" denotes multiplication. The same is applied to the below-mentioned formulae.

Another aspect of the invention is directed to an ultra wide angle imaging lens device comprising the ultra wide angle imaging optical system, and an image sensor for converting an optical image of an object into an electrical signal, wherein the ultra wide angle imaging optical system is so configured as to form the optical image of the object onto a light receiving plane of the image sensor.

Yet another aspect of the invention is directed to an image sensing apparatus comprising the ultra wide angle imaging lens device, and a controller for controlling the ultra wide angle imaging lens device and the image sensor to execute a photographing operation of the object.

The above arrangements enable to provide an ultra wide angle imaging optical system, with an ultra wide viewing angle in the first direction e.g. the horizontal direction, a less viewing angle in the second direction e.g. the vertical direction, a relatively less image distortion, and a less field curvature aberration, a less astigmatism, or the like, which enables to suppress an increase in the parts cost, as well as an imaging lens device provided with the ultra wide angle imaging optical system, and an image sensing apparatus mounted with the ultra wide angle imaging lens device.

These and other objects, features and advantages of the present invention will become more apparent upon reading the following detailed description along with the accompanying drawings.

BRIEF DESCRIPTION OF THE DRAWING

FIGS. 3A and 3B are diagrams showing an example of a car-mounted camera, wherein FIG. 3A is a side view of an automobile loaded with the car-mounted camera, and FIG. 3B is a top plan view.

FIG. 4 is a functional block diagram showing an electrical configuration of the car-mounted camera.

FIG. 5 is a cross-sectional view longitudinally taken along an optical axis, showing an arrangement of lens elements in an ultra wide angle imaging optical system of Example 1, specifically, a diagram showing a horizontal section i.e. the yz-section.

FIG. 6 is a cross-sectional view longitudinally taken along the optical axis, showing the arrangement of the lens elements in the ultra wide angle imaging optical system of Example 1, specifically, a diagram showing a vertical section i.e. the xz-section.

DETAILED DESCRIPTION OF THE PREFERRED EMBODIMENTS

Figure 1:
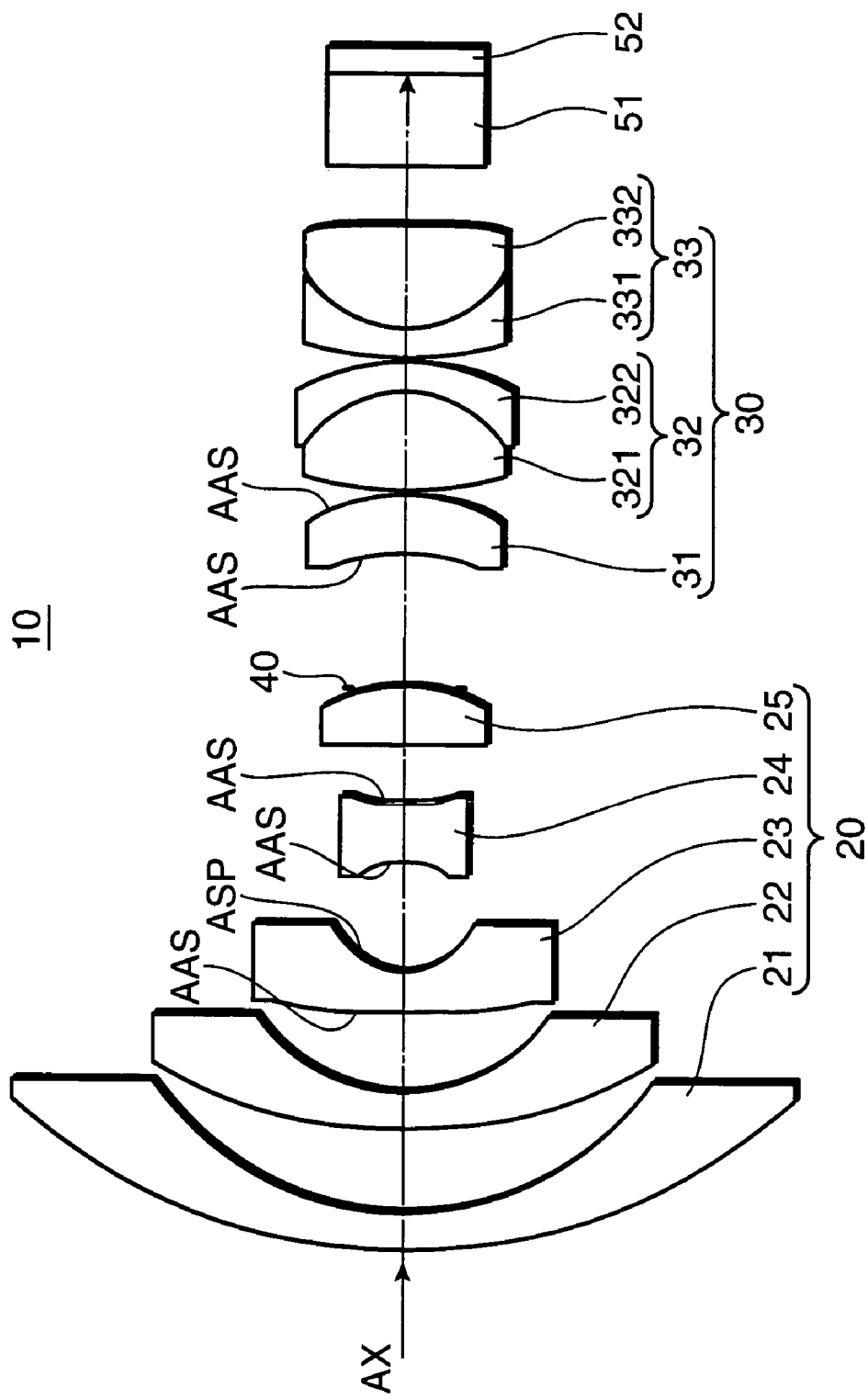
FIG. 1 is a cross-sectional view of an ultra wide angle imaging optical system embodying the invention taken along a direction of an optical axis, schematically showing a horizontal section i.e. the yz-section.

An embodiment of the invention will be described referring to the drawings.

<Description on Arrangement of Ultra Wide Angle Imaging Optical System>

Figure 2:
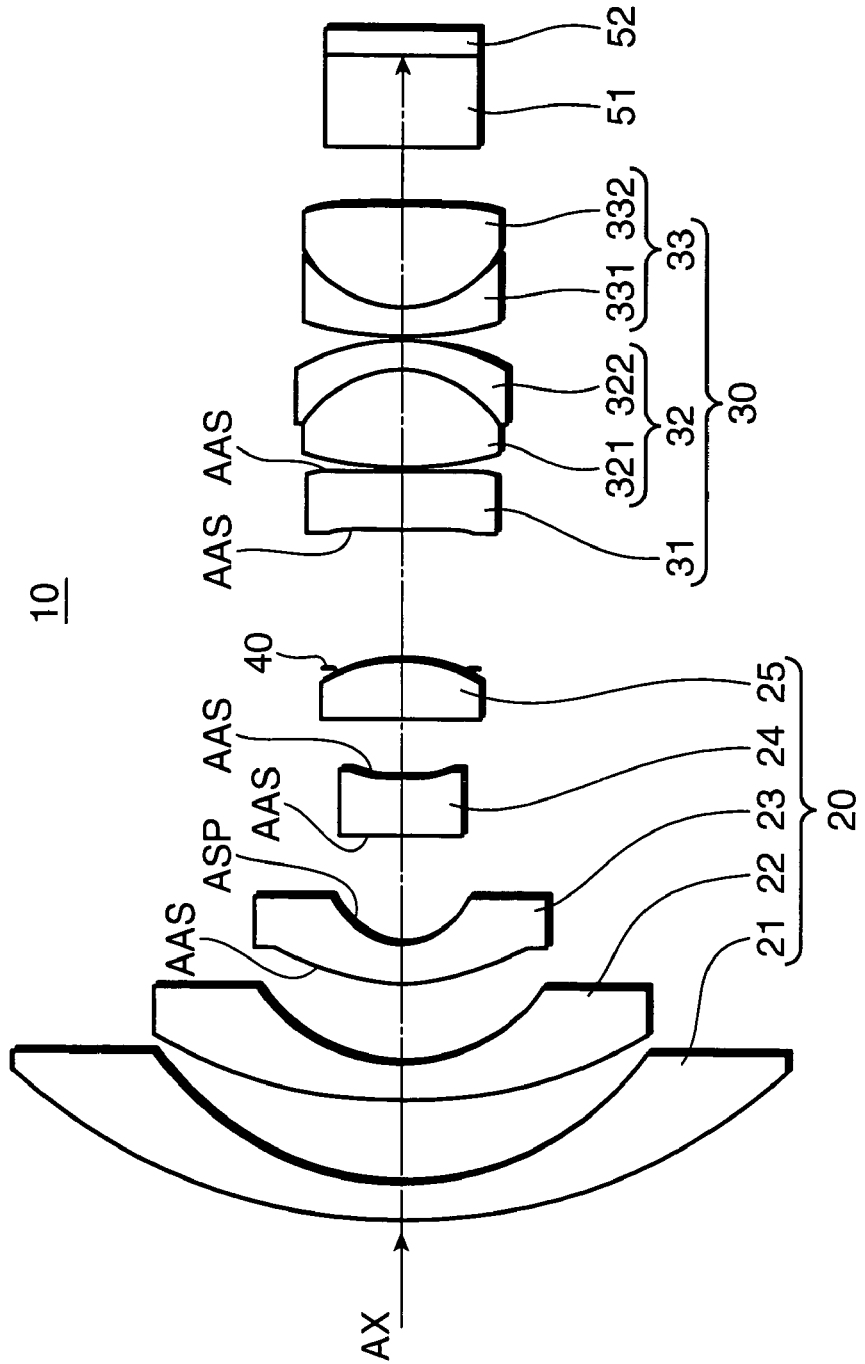
FIG. 2 is a cross-sectional view of the ultra wide angle imaging optical system embodying the invention taken along the optical axis direction, schematically showing a vertical section i.e. the xz-section.

FIGS. 1 and 2 are cross-sectional views each showing an arrangement of an ultra wide angle imaging optical system 10 embodying the invention taken along the direction of an optical axis AX. FIG. 1 shows a cross section extending in a horizontal direction, as a first direction, i.e. the yz-section. FIG. 2 shows a cross section extending in a vertical direction, as a second direction, i.e. the xz-section. The ultra wide angle imaging optical system 10 shown in FIGS. 1 and 2 is identical in the arrangement to an ultra wide angle imaging optical system 10A of Example 1 to be described later.

The ultra wide angle imaging optical system 10 includes a first lens group 20 as a forward lens group, a second lens group 30 as a rearward lens group, and an aperture stop 40, and is adapted to form an optical image of an object on a light receiving plane of an image sensor 52 for converting the optical image into an electric signal. Specifically, the first lens group 20, the aperture stop 40, the second lens group 30, a cover glass 51, and the image sensor 52 are arranged in order from the object side.

In the embodiment, the first lens group 20 includes, from the position closest to the object side in order, a negative meniscus lens element convex to the object side, a negative lens element, and a negative lens element. In the example of FIG. 1, the first lens group 20 includes five lens elements in total, i.e., a negative meniscus lens element convex to the object side, as the first lens element 21; a negative meniscus lens element convex to the object side, as a second lens element 22; a negative meniscus lens element convex to the object side, as a third lens element 23; a biconcave negative lens element, as a fourth lens element 24; and a biconvex positive lens element, as a fifth lens element 25. The third lens element 23 and the fourth lens element 24 are each provided with an anamorphic surface whose optical powers are different with respect to a section extending in the first direction on a flat plane substantially orthogonal to the optical axis AX i.e. the yz-section in FIG. 1, and with respect to a section extending in the second direction substantially orthogonal to the first direction i.e. the xz-section in FIG. 2. Hereinafter, yz-direction is called as "horizontal direction", and yz-section is called as "horizontal section", and xz-direction is called as "vertical direction", and xz-section is called as "vertical section". Specifically, the object side surface of the third lens element 23 is an anamorphic aspherical surface AAS, whereas the imaging side surface thereof is an aspherical surface APS, and both surfaces of the fourth lens element 24 are anamorphic aspherical surfaces AAS.

In the embodiment, the second lens group 30 includes a plurality of positive lens elements. In the example of FIG. 1, the second lens group 30 includes three lens elements in total, i.e., a positive meniscus lens element convex to the imaging side, as a sixth lens element 31; a cemented lens element which is constituted of a biconvex positive lens element 321 and a negative meniscus lens element 322 convex to the imaging side, and which has a positive optical power as a whole, as a seventh lens element 32; and a cemented lens element which is constituted of a negative meniscus lens element 331 convex to the object side and a biconvex positive lens element 332, and which has a positive optical power as a whole, as an eighth lens element 33. The sixth lens element 31 is a lens element whose both surfaces are anamorphic aspherical surfaces AAS. As mentioned above, in the ultra wide angle imaging optical system 10, the first lens group 20 includes the three anamorphic surfaces i.e. the object-side surface of the third lens element 23 and the both surfaces of the fourth lens element 24; and the second lens group 30 includes the two anamorphic surfaces i.e. the both surfaces of the sixth lens element 31. The anamorphic surfaces are made aspherical both in the horizontal direction and the vertical direction.

The image sensor 52 is provided on the imaging side of the ultra wide angle imaging optical system 10, with the cover glass 51 being provided between the image sensor 52 and the lens elements. This allows an optical image of an object to be guided to the light receiving plane of the image sensor 52 through the ultra wide angle imaging optical system 10 along the optical axis AX, with a wide viewing angle in the horizontal direction and a narrow viewing angle in the vertical direction, thereby causing the object optical image to be captured by the image sensor 52.

The image sensor 52 is adapted to photoelectrically convert the object optical image into image signals of respective color components of R, G, and B in accordance with the amount of the object optical image formed by the ultra wide angle imaging optical system 10 for output of the image signals. For instance, the image sensor 52 is a one-chip color area sensor of a so-called "Bayer matrix", in which patches of color filters each in red (R), green (G), and blue (B) are attached in a checkered pattern on respective surfaces of charge coupled devices (CCDs) arrayed in two dimensions. Examples of the image sensor 52 are a CMOS image sensor, and a VMIS image sensor in addition to the CCD image sensor.

Assuming that the lens element having the anamorphic surface in the first lens group 20 i.e. the third lens element 23 and/or the fourth lens element 24 has an optical power Ph in the horizontal direction, as the first direction, where the viewing angle is wide, an optical power Pv in the vertical direction, as the second direction, where the viewing angle is narrow, a focal length fh in the horizontal direction with respect to the entirety of the ultra wide angle imaging optical system 10, and a focal length fv in the vertical direction with respect to the entirety of the ultra wide angle imaging optical system 10, the ultra wide angle imaging optical system 10 satisfies the following conditional formula (1):

$$-0.6 < (Ph-Pv)*(fh+fv) < -0.1 \quad (1)$$

With this arrangement, the viewing angles in the horizontal direction and the vertical direction can be optimized, and the ultra wide angle imaging optical system 10 having desirable optical characteristics can be produced.

Preferably, the value of (Ph−Pv)*(fh+fv) in the above conditional formula (1) may satisfy the following conditional formula (1)'.

$$-0.5 < (Ph-Pv)*(fh+fv) < -0.25 \quad (1)'$$

If the value of (Ph−Pv)*(fh+fv) is under the lower limit of the conditional formula (1)', a difference in cross-sectional configuration with respect to the horizontal direction and the vertical direction is unduly increased, which makes it difficult to process or mold an intended surface configuration, thereby raising the parts cost. On the other hand, if the value of (Ph−Pv)*(fh+fv) is over the upper limit of the conditional formula (1)', a difference in focal length with respect to the horizontal direction and the vertical direction is unduly decreased. With such an unduly small focal length difference, if a sufficiently wide viewing angle is provided in the horizontal direction, the viewing angle in the vertical direction is unduly increased, which may increase an image distortion in the vertical direction.

Preferably, the value of fv/fh may satisfy the following conditional formula (2).

$$1.7 < fv/fh < 3.0 \quad (2)$$

The above configuration enables to suppress the viewing angle with respect to the vertical section from unduly increasing, and to desirably correct a field curvature or an astigmatism with respect to the horizontal section.

As configured in the ultra wide angle imaging optical system 10 shown in FIG. 1, the anamorphic surface provided in the first lens group 20 and/or the second lens group 30 may be a surface whose optical powers are different with respect to the horizontal section and the vertical section. For instance, the anamorphic surface may be a cylindrical surface, wherein, for instance, the horizontal section is spherical or aspherical, and the vertical section is flat; or a toric surface, wherein, for instance, the horizontal section is spherical or aspherical, and the vertical section is a spherical surface having different curvatures. Preferably, both the horizontal section and the vertical section may be formed into an aspherical shape. This enables to sufficiently correct an aberration, and to make the ultra wide angle imaging optical system 10 compact.

Concerning the production method of the ultra wide angle imaging optical system 10, lens materials of the lens elements constituting the first lens group 20 and the second lens group 30 are not specifically limited. Lens materials such as various optical glass materials or optical resin materials i.e. plastic materials may be used. Use of the resin materials is advantageous, as compared with the case of using the glass materials, in the aspect of suppressing the parts cost and reducing the weight of the ultra wide angle imaging optical system 10, because the resin materials are lightweight, and mass-producible by injection molding or a like technique. Therefore, it is desirable to provide at least one resin lens element in the ultra wide angle imaging optical system 10. Alternatively, two or more resin lens elements may be provided.

Preferably, the first lens element 21 which is located closest to the object side in the ultra wide angle imaging optical system 10 may be a glass lens element having a spherical surface. It is often the case that the first lens element 21 undergoes a severe environmental condition because of its closest position to the object side when used in monitoring the exterior or being mounted in an automobile, which is a primary usage of the ultra wide angle imaging optical system. If a resin lens element is used as the first lens element 21, sufficient durability of the first lens element 21 may not be retained. On the other hand, in the ultra wide angle imaging optical system having a viewing angle of more than 180 degrees in the horizontal direction, the lens diameter of the first lens element 21 may be unduly increased to secure the wide viewing angle. If an aspherical surface processing is applied to the first lens element 21 having such a large lens diameter, the production cost of the first lens element 21 may be increased. In view of this, a glass lens element having a spherical surface is used as the first lens element closest to the object side, which enables to suppress the cost increase and to secure the durability Preferably, the ultra wide angle imaging optical system 10 includes at least one resin lens element having a negative optical power, and at least one resin lens element having a positive optical power, in addition to the resin lens element having the anamorphic surface. In the example shown in FIGS. 1 and 2, among the lens elements having the anamorphic surfaces, the third lens element 23 and the fourth lens element 24 of the first lens group 20 have a negative optical power, and the sixth lens element 31 of the second lens group 30 has a positive optical power.

Since the anamorphic surface has a unique surface configuration, glass molding may likely to increase the processing or molding cost. Use of a resin lens element as the lens element having the anamorphic surface lowers the production cost of the lens element. However, generally, the resin material has a larger variation in surface configuration or in refractive index due to a change in temperature, as compared with a glass material. Accordingly, a variation in performance of the imaging optical system i.e. shifting of the focal position or variation in field curvature may be unduly increased if the ambient temperature is changed. In view of this, at least one each of the resin lens element having the negative optical power and the resin lens element having the positive optical power are included in the ultra wide angle imaging optical system 10 so that the focal position shifting or the field curvature variation due to the temperature change can be cancelled by the lens elements having the negative and positive powers. This enables to suppress the performance variation with respect to the entirety of the optical system even if the ambient temperature in use is changed.

In use of the resin lens element, assuming that the resin lens element closest to the aperture stop 40 in the first lens group 20 e.g. the fifth lens element 25 has a focal length $f_{1af}$ (in the case of a lens element having an anamorphic surface e.g. the fourth lens element 24, the average of the focal lengths of the horizontal section and the vertical section), and the resin lens element closest to the aperture stop 40 in the second lens group 30 e.g. the sixth lens element 31 has a focal length $f_{1ar}$ (in the case of a resin lens element having an anamorphic surface, the average of the focal lengths of the horizontal section and the vertical section), preferably, the value of $f_{1af}/f_{1ar}$ may satisfy the following conditional formula (3).

$$-0.5 < f_{1af}/f_{1ar} < 0.0 \quad (3)$$

This configuration enables to easily correct a spherical aberration or a field curvature, and to secure back focus adjustment of the optical system.

Preferably, the value $f_{1af}/f_{1ar}$ in the conditional formula (3) may satisfy the following conditional formula (3)'.

$$-0.45 < f_{1af}/f_{1ar} < -0.25 \quad (3)'$$

If the value of $f_{1af}/f_{1ar}$ is under the lower limit of the conditional formula (3)', the focal length of the resin lens element closer to the object side relative to the aperture stop 40 may be unduly increased, or the focal length of the resin lens element closer to the imaging side relative to the aperture stop 40 may be unduly decreased. As a result, the resin lens element closer to the imaging side relative to the aperture stop 40 may unduly increase the performance variation when the ambient temperature is changed. This makes it difficult to cancel the performance variation by the resin lens element closer to the object side relative to the aperture stop 40. On the other hand, if the value of $f_{1af}/f_{1ar}$ is over the upper limit of the conditional formula (3)', the focal length of the resin lens element closer to the object side relative to the aperture stop 40 may be unduly decreased, or the focal length of the resin lens element closer to the imaging side relative to the aperture stop 40 may be unduly increased. As a result, the resin lens element closer to the object side relative to the aperture stop 40 may unduly increase the performance variation when the ambient temperature is changed. This makes it difficult to cancel the performance variation by the resin lens element closer to the imaging side relative to the aperture stop 40.

In the thus constructed ultra wide angle imaging optical system 10, even with use of an optical system having e.g. an ultra wide viewing angle in the horizontal direction and a less viewing angle in the vertical direction, an optical system with a less image distortion, a less aberration, and a like advantage can be provided.

In the case where the image sensor 52 is of a rectangular shape having a longer side and a shorter side, preferably, the longer side direction may substantially coincide with the extending direction of the horizontal section of the ultra wide angle imaging optical system 10 having a short focal length and an intended wide viewing angle. With the preferred configuration, a sufficiently large image height can be secured in the longer side direction of the image sensor 52 i.e. with respect to the horizontal section where an ultra wide viewing angle is required, and the image height can be reduced in the shorter side direction of the image sensor 52 i.e. with respect to the vertical section where a wide viewing angle is not required. This enables to secure an ultra wide viewing angle in the horizontal direction, and simultaneously to prevent the viewing angle in the vertical direction from unduly increasing.

<Description on Embodiment Concerning Image Sensing Apparatus>

Figure 3A:
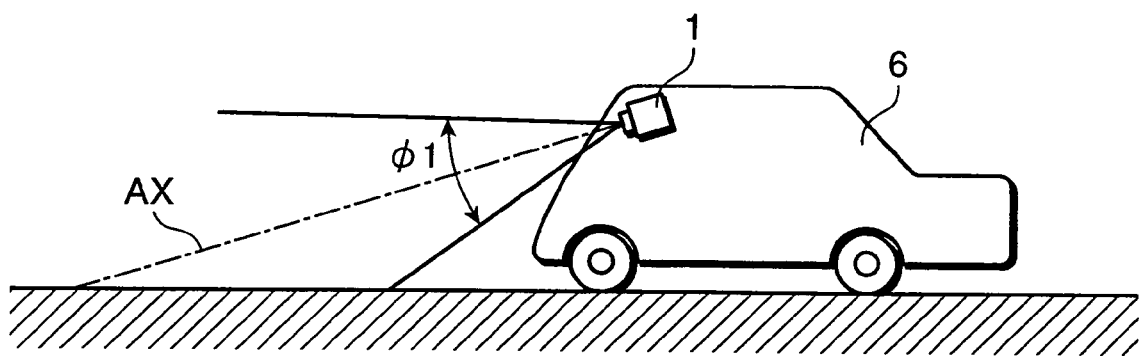
Figure 3B:
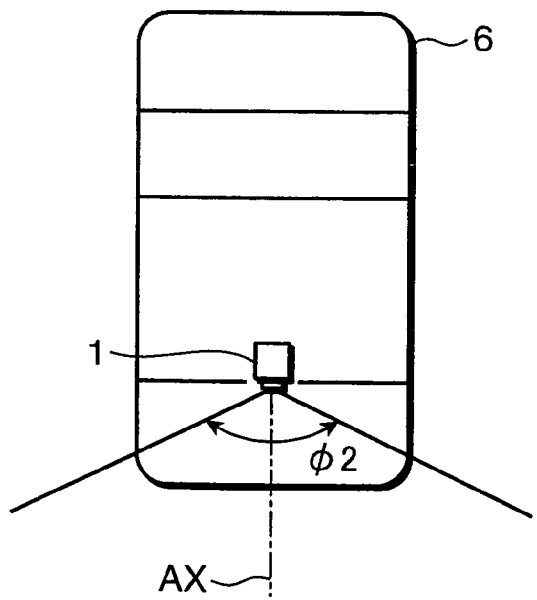

The ultra wide angle imaging optical system 10 having the above configuration is adapted to be loaded in a car-mounted camera 1 for capturing an area around an automobile 6, for instance, as shown in FIGS. 3A and 3B. The car-mounted camera 1 is installed at a predetermined position on a rear portion of the automobile 6 to capture a rear area of the automobile 6. An image of an object captured by the car-mounted camera 1 is displayed on an unillustrated monitor mounted on e.g. a dashboard of the automobile 6. As shown in FIG. 3A, the car-mounted camera 1 is tiltingly mounted in an obliquely downward orientation, with its optical axis AX extending obliquely downwardly, considering that viewing in an upward direction of the automobile 6 i.e. a vertical direction with respect to a road surface is generally not required. Accordingly, the viewing angle in the vertical direction is defined as a relatively narrow viewing angle φ1. On the other hand, as shown in FIG. 3B, a wide viewing angle is required with respect to a widthwise direction of the automobile 6 i.e. a horizontal direction with respect to the road surface to secure a wide viewing. In view of this, the viewing angle in the horizontal direction is defined as a relatively wide viewing angle φ2. In the example of FIG. 3B, the viewing angle in the horizontal direction is equal to or less than 180 degrees. However, a viewing angle of more than 180 degrees is required in the horizontal direction depending on a condition. In view of the above, the ultra wide angle imaging optical system 10 is loaded in the car-mounted camera 1 in such a manner that the direction of the ultra wide angle imaging optical system 10 where a wide viewing angle is provided is coincident with the widthwise direction of the automobile 6.

FIG. 4 is a functional block diagram showing an electrical configuration of the car-mounted camera 1. The car-mounted camera 1 includes an imaging section 70, an image generator 71, an image data buffer 72, an image processor 73, a controller 74, a storage 75, and a monitor 76.

The imaging section 70 has an imaging lens device 101 provided with the ultra wide angle imaging optical system 10 and the image sensor 52. Light from an object is received on the light receiving plane of the image sensor 52 through the ultra wide angle imaging optical system 10, thereby forming an optical image of the object. The image sensor 52 converts the object optical image formed by the ultra wide angle imaging optical system 10 into electrical signals i.e. image signals of respective color components of R (Red), G (Green), and B (Blue), and outputs the image signals to the image generator 71 as image signals of the respective color components. The image sensor 52 performs, under the control of the controller 74, imaging operations such as an operation of capturing a still image or a moving image (in this case, primarily, a monitor moving image), and an operation of reading output signals from the respective pixels of the image sensor 52 e.g. horizontal synchronization, vertical synchronization, and transfer.

The image generator 71 performs an amplification process, a digital conversion process, or a like process with respect to the analog output signals from the image sensor 52, and performs well-known image processing such as black level conversion to obtain an optimal black level, gamma correction, white balance adjustment (WB adjustment), contour correction, color shading correction, and the like with respect to the entirety of the image to generate image data of the pixels based on the image signals. The image data generated by the image generator 71 is outputted to the image data buffer 72.

The image data buffer 72 temporarily stores the image data, and serves as a memory to be used as a work area where the image processor 73 executes a below-mentioned processing with respect to the image data. An example of the image data buffer 72 is an RAM (Random Access Memory).

The image processor 73 is a circuit for executing an image processing such as a resolution conversion with respect to the image data stored in the image data buffer 72. Alternatively, the image processor 73 may be so configured as to correct an aberration that could not be corrected by the ultra wide angle imaging optical system 10 according to needs.

The controller 74 has a microprocessor, for instance, and controls operations of the respective parts of the car-mounted camera 1 i.e. the imaging section 70, the image generator 71, the image data buffer 72, the image processor 73, the storage 75, and the monitor 76. In other words, the controller 74 controls the imaging section 70 to primarily capture a moving image of an object in a rear area of the automobile 6.

The storage 75 is a memory circuit for storing image data generated by capturing a still image or a moving image of the object. For instance, the storage 75 is provided with an ROM (Read Only Memory), and an RAM. In other words, the storage 75 has a function of a memory for storing still images and moving images.

The monitor 76 includes a liquid crystal panel, is disposed in the interior of the automobile 6, and displays the moving image of the object in the rear area of the automobile 6 which is captured by the imaging section 70.

Now, an imaging operation of the car-mounted camera 1 having the above configuration is described. In response to a depressing operation of a button provided on the monitor, or in response to selection of a backgear operation by way of a transmission of the automobile 6, for instance, an imaging operation of the car-mounted camera 1 is started. When the imaging operation is started, the controller 74 controls the imaging section 70 to capture a moving image of an object. With the moving image capturing, an optical image of the object in the rear area of the automobile 6 is cyclically formed on the light receiving plane of the image sensor 52. After conversion of the object optical image into image signals of the respective color components of R, G, and B, the image signals are outputted to the image generator 71. The image signals are then temporarily stored in the image data buffer 72. After image processing by the image processor 73, the processed signals are transferred to the storage 75, and then, displayed on the monitor 76 as a moving image. In this way, the driver of the automobile 6 can confirm the status of the rear area, which is a blind zone.

The imaging lens device 101 may have a plane parallel plate corresponding to an optical low-pass filter, in addition to the ultra wide angle imaging optical system 10 for forming an optical image of an object. Examples of the optical low-pass filter are a birefringent low-pass filter made of e.g. a quartz or a like material whose crystalline axial direction is aligned with a predetermined direction, and a phase low-pass filter capable of providing a required optical shielding frequency characteristic by a diffraction effect.

The optical low-pass filter may not be necessarily provided. Alternatively, an infrared cut filter may be provided to reduce a noise included in the image signals outputted from the image sensor 52, in place of the optical low-pass filter. Further alternatively, both functions of the optical low-pass filter and the infrared cut filter may be provided in one element by applying an infrared reflective coat on a surface of an optical low-pass filter.

The foregoing description is made concerning the example that the inventive ultra wide angle imaging optical system 10 is loaded in the car-mounted camera 1. Alternatively, the inventive ultra wide angle imaging optical system 10 can be applied to a monitoring camera such as a security camera, a digital device, or a like device. Examples of the digital device are a mobile phone, a PDA (Personal Digital Assistant), a personal computer, a mobile computer, and peripheral devices of these devices.

<Description on Practical Examples Concerning Imaging Optical System>

In this section, exemplified arrangements of the ultra wide angle imaging optical system 10 as shown in FIGS. 1 and 2, specifically, of the ultra wide angle imaging optical system 10 constituting the imaging lens device 101 to be loaded in the car-mounted camera 1 as shown in FIG. 3 will be described referring to the drawings.

EXAMPLE 1

FIGS. 5 and 6 are cross-sectional views i.e. optical path diagrams longitudinally taken along the optical axis (AX), showing a lens arrangement in an ultra wide angle imaging optical system 10A of Example 1. FIG. 5 shows a horizontal section i.e. the yz-section, and FIG. 6 shows a vertical section i.e. the xz-section. The ultra wide angle imaging optical system 10A includes, from the object side in order, a first lens group (Gr1), an aperture stop (ST), a second lens group (Gr2), a cover glass (CG), and an image sensor (SR).

The first lens group (Gr1) is constituted of five lens elements in total, i.e., a negative meniscus lens element convex to the object side, as a first lens element (L1); a negative meniscus lens element convex to the object side, as a second lens element (L2); a negative lens element having an anamorphic aspherical surface on the object side, and an aspherical surface on the imaging side, as a third lens element (L3); a negative lens element having an anamorphic aspherical surface on both surfaces thereof, as a fourth lens element (L4); and a biconvex positive lens element, as a fifth lens element (L5). The third lens element (L3) is a biconcave negative lens element with respect to the horizontal section, and is a negative meniscus lens element convex to the object side with respect to the vertical section. Also, the fourth lens element (L4) is a biconcave negative lens element with respect to both the horizontal section and the vertical section.

The second lens group (Gr2) is constituted of three lens elements in total, i.e., a positive lens element having an anamorphic aspherical surface on both surfaces thereof, as a sixth lens element (L6); a cemented lens element which is constituted of a biconvex positive lens element (L71) and a negative meniscus lens element (L72) convex to the imaging side, and which has a positive optical power as a whole, as a seventh lens element (L7); and a cemented lens element which is constituted of a negative meniscus lens element (L81) convex to the object side and a biconvex positive lens element (L82), and which has a positive optical power as a whole, as an eight lens element (L8). The sixth lens element (L6) is a positive meniscus lens element convex to the imaging side with respect to both the horizontal section and the vertical section.

The symbol ri (i=1, 2, 3, ...) attached to the respective lens surfaces in FIGS. 5 and 6 indicates the i-th lens surface from the object side, a surface ri attached with an asterisk * is an aspherical surface, and a surface ri attached with a mark # is an anamorphic aspherical surface. It should be noted that the aperture stop (ST), both surfaces of the cover glass (CG), and a light receiving plane of the image sensor (SR) are also regarded as a surface. The same definition is applied to the optical path diagrams of FIGS. 7 through 10 concerning other Examples to be described later, and the meanings of the symbols in FIGS. 7 through 10 are basically the same as those in FIGS. 5 and 6. The meanings, however, are not completely identical. For instance, throughout the drawings, the lens surface closest to the object side is attached with the same symbol r1. However, this does not means that the curvatures or the like of all the lens surfaces closest to the object side are identical throughout the Examples.

In the above arrangement, an incident ray from the object side is propagated in order through the lens elements (L1 through L5) of the first lens group (Gr2), the aperture stop (ST), the lens elements (L6 through L8) of the second lens group (Gr2), and the cover glass (CG), and forms an optical image of an object on the light receiving plane of the image sensor (SR). Then, the optical image is converted into electrical signals by the image sensor (SR). The electrical signal is subjected to a predetermined digital image processing, image compression, or a like processing, according to needs, and is displayed on a predetermined display device e.g. the monitor 76 shown in FIG. 4, as a monitor image.

Construction data on the respective lens elements in the ultra wide angle imaging optical system 10A of Example 1 are described in Tables 1, 2, and 3. Table 12, which will be described later, shows numerical values of the elements in the aforementioned conditional formulae (1) through (3) in the case where the conditional formulae (1) through (3) are applied to the ultra wide angle imaging optical system 10A of Example 1.

TABLE 1

| lens surface | radius of curvature | axial distance between surfaces (mm) | refractive index | Abbe number |
| --- | --- | --- | --- | --- |
| r1 | 19.400 | 1.300 | 1.785900 | 43.9296 |
| r2 | 10.002 | 2.789 | | |
| r3 | 16.294 | 1.300 | 1.785900 | 43.9296 |
| r4 | 5.887 | 2.766 | | |
| r5# | −35.740 | 1.300 | 1.525110 | 56.2216 |
| r6* | 1.845 | 3.800 | | |
| r7# | −2.908 | 2.000 | 1.525110 | 56.2216 |

TABLE 1-continued

| lens surface | radius of curvature | axial distance between surfaces (mm) | refractive index | Abbe number |
| --- | --- | --- | --- | --- |
| r8# | 11.517 | 2.000 | | |
| r9 | 142.400 | 2.000 | 1.785900 | 43.9296 |
| r10 | −5.000 | −0.242 | | |
| r11 (aperture stop) | ∞ | 4.697 | | |
| r12# | −8.230 | 2.000 | 1.525110 | 56.2216 |
| r13# | −6.285 | 0.200 | | |
| r14 | 14.725 | 3.300 | 1.589130 | 61.2401 |
| r15 | −4.000 | 1.000 | 1.846660 | 23.7826 |
| r16 | −7.197 | 0.200 | | |
| r17 | 14.506 | 1.000 | 1.846660 | 23.7826 |
| r18 | 3.950 | 3.500 | 1.516800 | 64.1988 |
| r19 | −19.648 | 2.000 | | |
| r20 | ∞ | 3.000 | 1.516800 | 64.2000 |
| r21 | ∞ | 0.000 | | |
| r22 (imaging surface) | ∞ | | | |

TABLE 2

| lens surface | conical coefficient | aspherical coefficient | | | |
| --- | --- | --- | --- | --- | --- |
| | | A | B | C | D |
| r6 | −0.9400 | 5.746E−03 | −5.303E−04 | 8.060E−06 | −1.149E−05 |

TABLE 3

| lens surface | extended aspherical coefficient | | | | |
| --- | --- | --- | --- | --- | --- |
| | conical coefficient | RDX | RDY | KX | KY |
| r5 | 0 | 6.623 | −35.74 | −0.1500 | −0.1500 |
| | AR | BR | CR | DR | |
| | 1.892E−03 | −2.325E−04 | 9.894E−06 | −1.479E−07 | |
| | AP | BP | CP | DP | |
| | 0.3967 | −3.460E−04 | 2.603E−03 | 5.176E−02 | |
| r7 | 0 | −214.2 | −2.908 | −0.1200 | −0.1200 |
| | AR | BR | CR | DR | |
| | −3.047E−03 | 6.718E−04 | −8.296E−04 | 1.842E−04 | |
| | AP | BP | CP | DP | |
| | 0.3802 | 0.1939 | 0.1173 | 0.1933 | |
| r8 | 0 | 5.005 | 11.52 | 0 | 0 |
| | AR | BR | CR | DR | |
| | 3.690E−03 | 1.1144E−04 | −3.047E−04 | 1.094E−04 | |
| | AP | BP | CP | DP | |
| | 0.2509 | −0.4320 | −6.020E−02 | 0.1333 | |
| r12 | 0 | −49.63 | −8.230 | 0 | 0 |
| | AR | BR | CR | DR | |
| | −2.441E−04 | 6.638E−05 | −9.665E−06 | 0 | |
| | AP | BP | CP | DP | |
| | 0.8034 | −0.4876 | −0.2005 | 0 | |
| r13 | 0 | −46.03 | −6.285 | 0 | 0 |
| | AR | BR | CR | DR | |
| | 4.970E−04 | −1.292E−09 | 2.220E−06 | 7.294E−07 | |
| | AP | BP | CP | DP | |
| | −0.2740 | 8.881 | −0.5817 | −0.1917 | |

Table 1 shows, from the left-side column thereof in order, the respective lens surface numbers, radii of curvature (unit: mm) of the respective lens surfaces, distances (unit: mm) between the respective sets of lens surfaces in the optical axis direction, namely, axial distances between the surfaces, refractive indices of the respective lens elements, and the Abbe numbers of the respective lens elements. The axial distance between the surfaces is a distance calculated, assuming that the air exists as a medium in a space between a set of opposing surfaces including an optical surface and an imaging surface. As shown in FIGS. 5 and 6, the symbol ri (i=1, 2, 3, . . . ) attached to the respective lens surfaces indicates the i-th optical surface from the object side along the optical path; the surface ri attached with an asterisk * is an aspherical surface such as a dioptric surface of an aspherical configuration or a surface having a refraction power substantially equivalent to the refraction power of an aspherical surface; and the surface ri attached with a mark # is an anamorphic aspherical surface. Further, since the aperture stop (ST), the both surfaces of the cover glass (CG), and the light receiving plane of the image sensor (SR) are flat, respective radii of curvature thereof are infinite ($\infty$).

Table 2 shows aspherical surface data concerning surfaces which are regarded as aspherical surfaces i.e. the surfaces ri attached with the asterisk * in Table 1. The aspherical configuration of the lens element is defined by the following conditional formula (4), wherein the apex of the lens surface is the point of origin, and a local orthogonal coordinate system (x, y, z), with the direction from the object toward the image sensor being the positive z-axis direction, is used.

$$z = \frac{ch^2}{1+SQRT\{1-(1-+k)c^2h^2} + Ah^4 + Bh^6 + Ch^8 + Dh^{10} + Eh^{12} + Fh^{14} + Gh^{16} + Hh^{18} + Jh^{20} \quad (4)$$

where z: a z-axis displacement at the height position h (relative to the apex of the lens surface);

h: a height in a direction perpendicular to the z-axis ($h^2=x^2+y^2$);

c: a curvature near the apex of the lens surface (=1/radius of curvature);

A, B, C, D, E, F, G, H, and J: aspherical coefficients of 4th, 6th, 8th, 10th, 12th, 14th, 16th, 18th, and 20th orders; and k: a conical coefficient.

Table 3 shows extended aspherical surface data concerning surfaces which are regarded as anamorphic aspherical surfaces i.e. the surfaces ri attached with the mark # in Table 1. The aspherical configuration of the lens element is defined by the following conditional formula (5), wherein the apex of the lens surface is the point of origin, and a local orthogonal coordinate system (x, y, z), with the direction from the object toward the image sensor being the positive z-axis direction, is used.

$$z = \frac{CUXx^2 + CUYy^2}{1+SQRT\{1-(1+KX)CUX^2x^2-(1+KY)CUY^2y^2\}+} \\ AR\{1-AP)x^2 + (1+AP)y^2\}^2 + BR\{(1-BP)x^2 + (1+BP)y^2\}^3 + \\ CR\{1-CP)x^2 + (1+CP)y^2\}^4 + DR(1-DP)x^2 + (1+DP)y^2\}^5 \quad (5)$$

where z: a displacement in the z-axis direction (relative to the apex of the lens surface);

x: a displacement in the x-axis direction (relative to the optical axis);

y: a displacement in the y-axis direction (relative to the optical axis);

CUX: a curvature near the apex of the lens surface in the x-axis direction (=1/radius of curvature in the x-axis direction=1/RDX); and CUY: a curvature near the apex of the lens surface in the y-axis direction (=1/radius of curvature in the y-axis direction=1/RDY)

Figure 11:
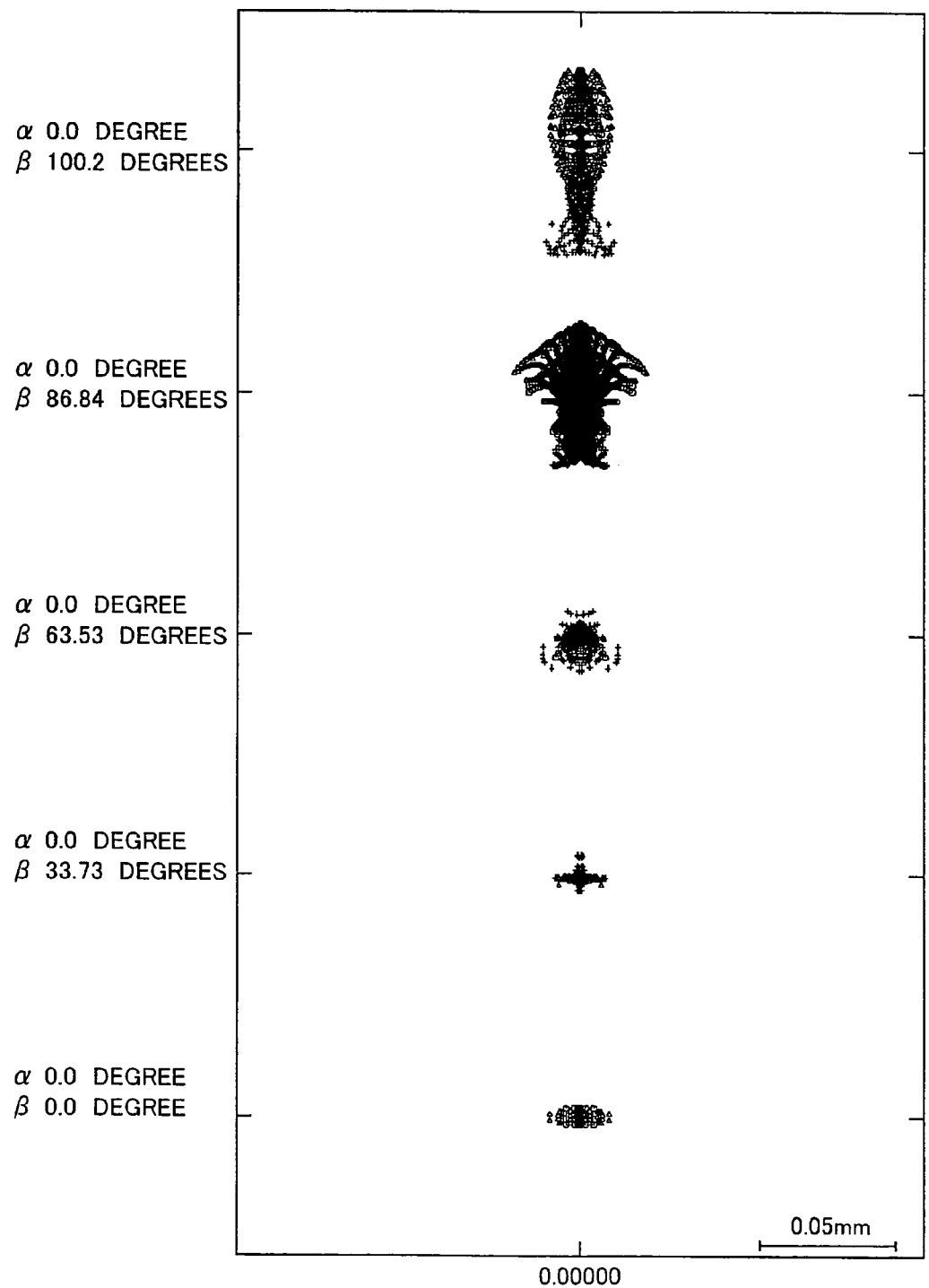
FIG. 11 is a spot diagram of the horizontal section i.e. the yz-section in Example 1.
Figure 12:
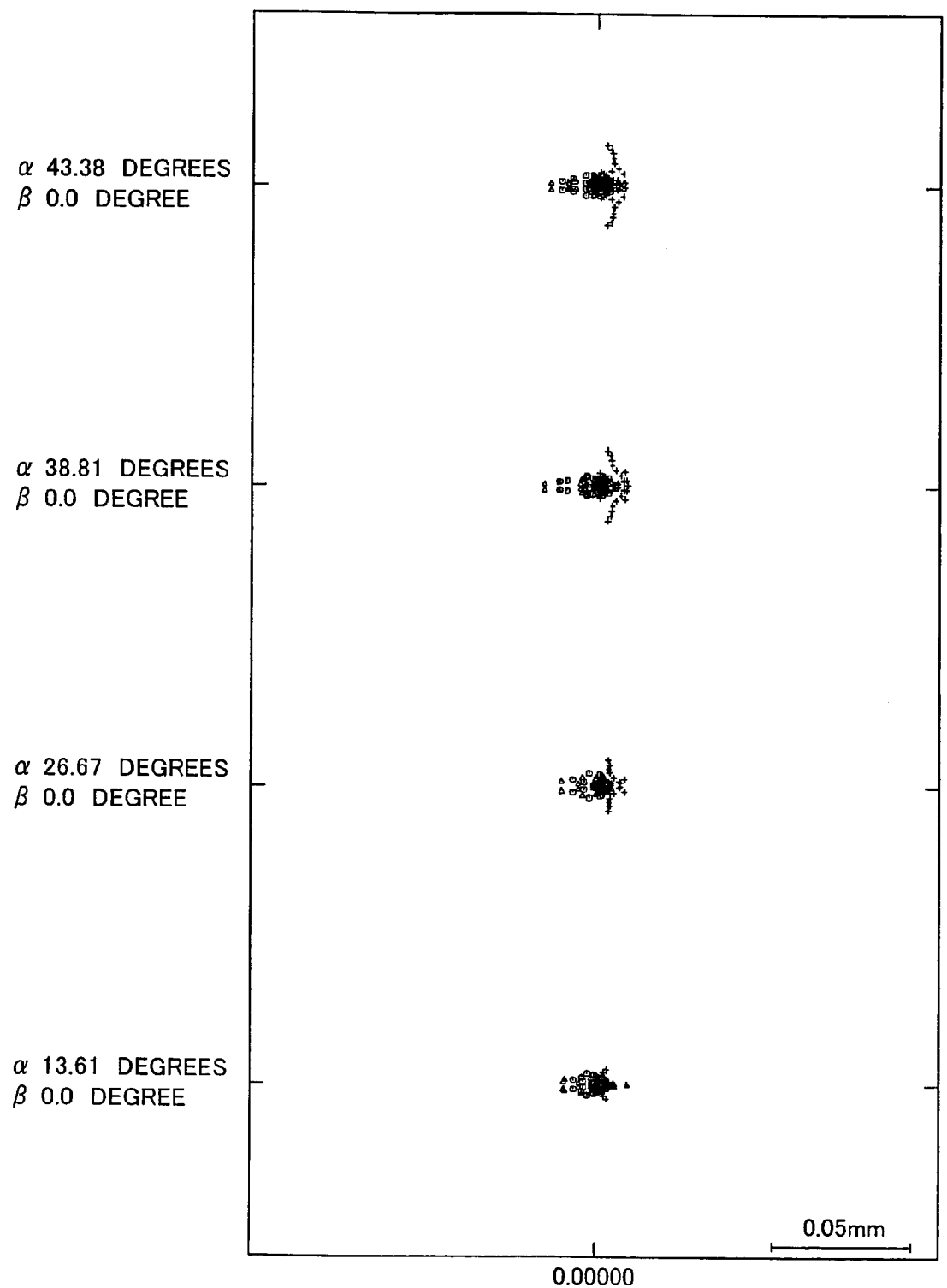
FIG. 12 is a spot diagram of the vertical section i.e. the xz-section in Example 1.

FIGS. 11 and 12 are spot diagrams showing an imaging plane of the image sensor (SR) in the ultra wide angle imaging optical system 10A of Example 1 having the aforementioned lens arrangement and construction. The spot diagrams show spots to be formed on the imaging plane of the image sensor (SR) in the case where three rays of different wavelengths i.e. a red ray having a wavelength of 656.28 nm, a yellow ray (so-called d-ray having a wavelength of 587.56 nm), and a blue ray having a wavelength of 435.84 nm are incident onto the ultra wide angle imaging optical system 10A with different incident angles. FIG. 11 is a spot diagram showing the horizontal section i.e. the yz-section, and FIG. 12 is a spot diagram showing the vertical section i.e. the xz-section. In the axis of ordinate in FIGS. 11 and 12, a represents an angle relative to the x-axis of the image sensor (SR) i.e. the longer side direction of the image sensor (SR), and β represents an angle relative to the y-axis of the image sensor (SR) i.e. the shorter side direction of the image sensor (SR). FIGS. 11 and 12 show that the ultra wide angle imaging optical system 10A of Example 1 has a superior imaging performance.

Tables 13 and 14, which will be described later, show focal lengths (unit: mm) and F-numbers of the ultra wide angle imaging optical system 10A with respect to the horizontal section and the vertical section. Tables 13 and 14 show that Example 1 provides a fast optical system with a short focal length.

EXAMPLE 2

Figure 7:
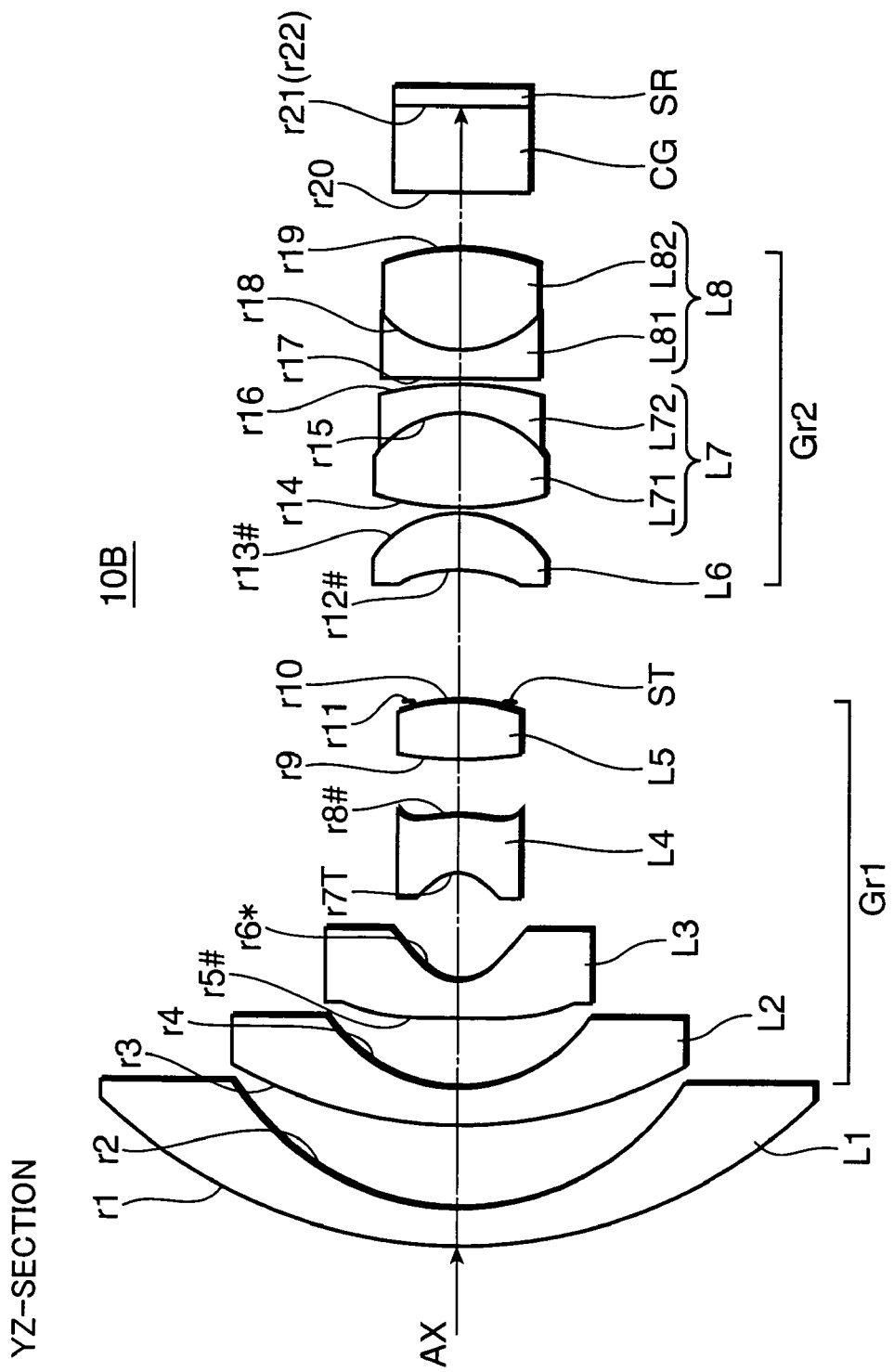
FIG. 7 is a cross-sectional view longitudinally taken along an optical axis, showing an arrangement of lens elements in an ultra wide angle imaging optical system of Example 2, specifically, a diagram showing a horizontal section i.e. the yz-section.
Figure 8:
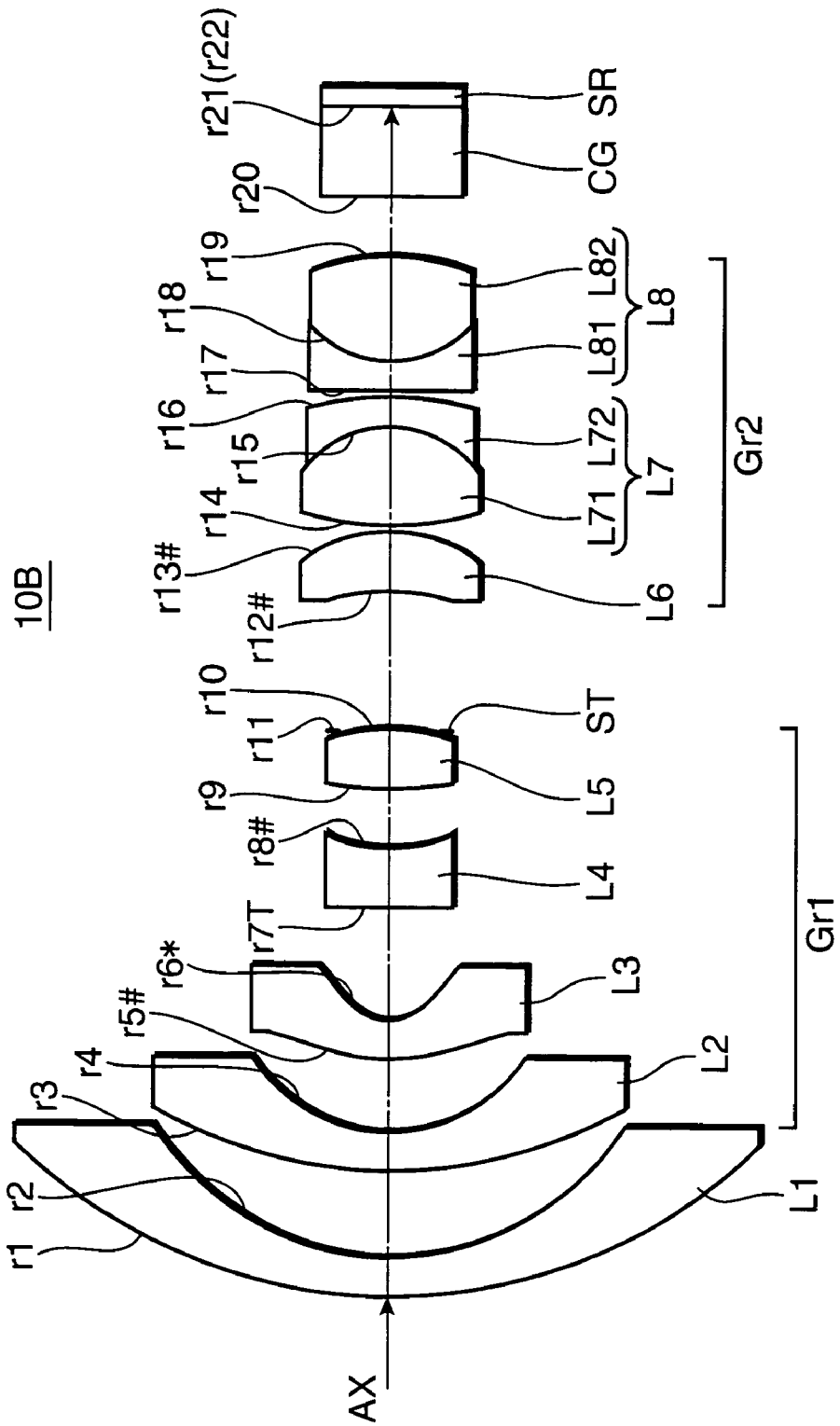
FIG. 8 is a cross-sectional view longitudinally taken along the optical axis, showing the arrangement of the lens elements in the ultra wide angle imaging optical system of Example 2, specifically, a diagram showing a vertical section i.e. the xz-section.

FIGS. 7 and 8 are cross-sectional views i.e. optical path diagrams longitudinally taken along the optical axis (AX), showing a lens arrangement in an ultra wide angle imaging optical system 10B of Example 2. FIG. 7 shows a horizontal section i.e. the yz-section, and FIG. 8 shows a vertical section i.e. the xz-section. The ultra wide angle imaging optical system 10B includes, from the object side in order, a first lens group (Gr1), an aperture stop (ST), a second lens group (Gr2), a cover glass (CG), and an image sensor (SR).

The first lens group (Gr1) is constituted of five lens elements in total, i.e., a negative meniscus lens element convex to the object side, as a first lens element (L1); a negative meniscus lens element convex to the object side, as a second lens element (L2); a negative lens element having an anamorphic aspherical surface on the object side, and an aspherical surface on the imaging side, as a third lens element (L3); a negative lens element having a toric aspherical surface on the object side and an anamorphic aspherical surface on the imaging side, as a fourth lens element (L4); and a biconvex positive lens element, as a fifth lens element (L5). The third lens element (L3) is a biconcave negative lens element with respect to the horizontal section, and is a negative meniscus lens element convex to the object side with respect to the vertical section. The fourth lens element (L4) is a negative lens element convex to the imaging side with respect to the horizontal section, and is a negative lens element having a flat surface on the object side with respect to the vertical section. The surface attached with the symbol T in FIGS. 7 and 8 represents a toric aspherical surface.

The second lens group (Gr2) is constituted of three lens elements in total, i.e., a positive lens element having an anamorphic aspherical surface on both surfaces thereof, as a sixth lens element (L6); a cemented lens element which is constituted of a biconvex positive lens element (L71) and a negative meniscus lens element (L72) convex to the imaging side, and which has a positive optical power as a whole, as a seventh lens element (L7); and a cemented lens element which is constituted of a negative lens element (L81) having a flat surface on the object side and a biconvex positive lens element (L82), and which has a positive optical power as a whole, as an eight lens element (L8). The sixth lens element (L6) is a positive meniscus lens element convex to the imaging side with respect to both the horizontal section and the vertical section.

Construction data on the respective lens elements in the ultra wide angle imaging optical system 10B of Example 2 are described in Tables 4, 5, 6, and 7. Table 12, which will be described later, shows numerical values of the elements in the aforementioned conditional formulae (1) through (3) in the case where the conditional formulae (1) through (3) are applied to the ultra wide angle imaging optical system 10B of Example 2.

TABLE 4

| lens surface | radius of curvature | axial distance between surfaces (mm) | refractive index | Abbe number |
|---|---|---|---|---|
| r1 | 19.279 | 1.319 | 1.785900 | 43.9296 |
| r2 | 10.032 | 2.919 | | |
| r3 | 17.489 | 1.300 | 1.785900 | 43.9296 |
| r4 | 5.942 | 2.478 | | |
| r5# | −52.962 | 1.300 | 1.525110 | 56.2216 |
| r6* | 1.658 | 3.800 | | |
| r7T | −1.223 | 2.000 | 1.525110 | 56.2216 |
| r8# | −5.251 | 2.000 | | |
| r9 | 14.651 | 2.000 | 1.785900 | 43.9296 |
| r10 | −7.001 | −0.142 | | |
| r11 (aperture stop) | ∞ | 4.736 | | |
| r12# | −6.372 | 2.000 | 1.525110 | 56.2216 |
| r13# | −4.226 | 0.200 | | |
| r14 | 11.498 | 3.300 | 1.589130 | 61.2401 |
| r15 | −4.029 | 1.000 | 1.846660 | 23.7826 |
| r16 | −11.847 | 0.200 | | |
| r17 | ∞ | 1.000 | 1.846660 | 23.7826 |
| r18 | 4.029 | 3.500 | 1.589130 | 61.2401 |
| r19 | −8.330 | 2.000 | | |
| r20 | ∞ | 3.000 | 1.516800 | 64.2000 |
| r21 | ∞ | 0.000 | | |
| r22 (imaging surface) | ∞ | | | |

TABLE 5

| lens surface | conical coefficient | aspherical coefficient | | | |
|---|---|---|---|---|---|
| | | A | B | C | D |
| r6 | −0.9400 | 1.251E−03 | 2.065E−03 | −6.694E−04 | 3.511E−05 |

TABLE 6

| lens surface | extended aspherical coefficient | | | | |
|---|---|---|---|---|---|
| | conical coefficient | RDX | RDY | KX | KY |
| r5 | 0 | 7.909 | −52.96 | −0.4500 | −0.4500 |
| | AR | BR | CR | DR | |

TABLE 6-continued

| lens surface | extended aspherical coefficient | | | | |
|---|---|---|---|---|---|
| | conical coefficient | RDX | RDY | KX | KY |
| | 1.192E−03 | −1.965E−04 | 6.231E−06 | −5.066E−08 | |
| | AP | BP | CP | DP | |
| | 0.5228 | 7.922E−02 | 6.992E−02 | 0.1415 | |
| r8 | 0 | 6.422 | −5.251 | 0 | 0 |
| | AR | BR | CR | DR | |
| | 6.873E−03 | −5.562E−05 | 6.173E−05 | 6.400E−06 | |
| | AP | BP | CP | DP | |
| | 0.4938 | −0.8732 | 0.6233 | −0.2870 | |
| r12 | 0 | −9.043 | −6.372 | 0 | 0 |
| | AR | BR | CR | DR | |
| | −1.597E−03 | 3.3363E−05 | −4.160E−05 | 1.5033E−06 | |
| | AP | BP | CP | DP | |
| | 5.363E−02 | −0.9054 | −4.095E−02 | 0.1200 | |
| r13 | 0 | −5.784 | −4.226 | 0 | 0 |
| | AR | BR | CR | DR | |
| | 2.220E−04 | −5.449E−05 | 9.797E−07 | −1.554E−06 | |
| | AP | BP | CP | DP | |
| | 0.5738 | 0.1296 | −0.9281 | −5.949E−02 | |

TABLE 7

| lens surface | toric coefficient | | |
|---|---|---|---|
| r7 | conical coefficient | RDX | RDY |
| | 0 | ∞ | −1.223 |
| | A | B | C | D |
| | 3.085E−03 | 2.532E−03 | 2.960E−04 | 1.860E−04 |

Tables 4 through 6 correspond to Tables 1 through 3 in Example 1. Table 7 shows toric coefficients of the surfaces which are regarded to be the toric aspherical surfaces i.e. the surfaces ri attached with the symbol "T" in Table 4. The aspherical configuration of the lens element is defined by the following conditional formula (6), wherein the apex of the lens surface is the point of origin, and a local orthogonal coordinate system (x, y, z), with the direction from the object toward the image sensor being the positive z-axis direction, is used. The same definition is applied to a toric aspherical surface in Example 3 to be described later.

$$z = \frac{cy^2}{1 + SQRT\{1 - (1+k)c^2 y^2\}} + Ay'^4 + By^6 + Cy^8 + Dy^{10} \quad (6)$$

where z: a z-axis displacement at the height position h (relative to the apex of the lens surface);

y: a displacement in the y-axis direction;

c: a curvature near the apex of the lens surface in the y-axis direction (=1/radius of curvature in the y-axis direction=1/RDY);

A, B, C, and D: aspherical coefficients of 4th, 6th, 8th, and 10th orders; and k: a conical coefficient.

The x-axis rotates around the center RDX of curvature with respect to the y-axis. Accordingly, a trajectory plane defined by the x-axis is aspherical with respect to the y-z flat plane, and is circular with respect to the x-z flat plane.

EXAMPLE 3

Figure 9:
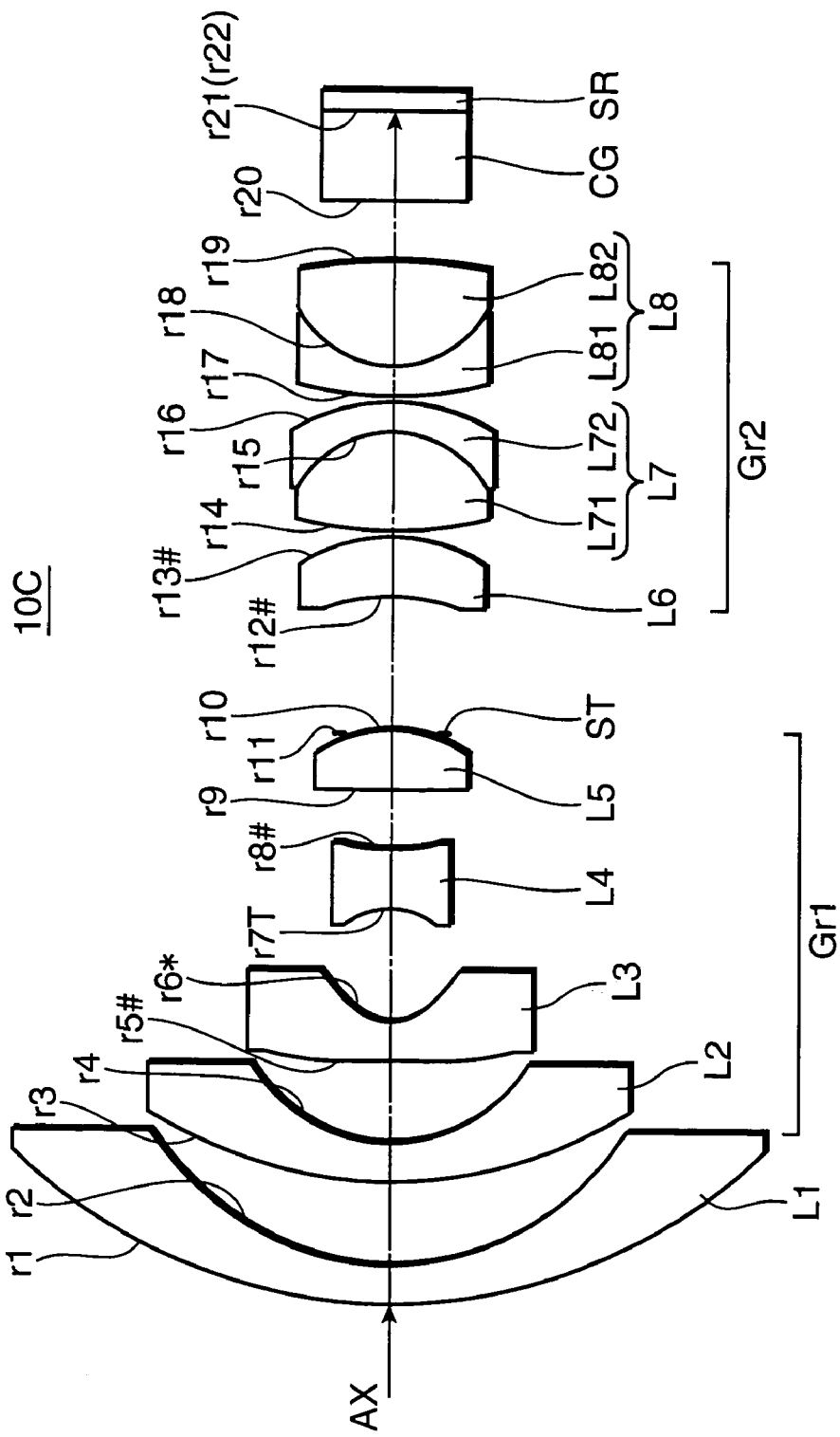
FIG. 9 is a cross-sectional view longitudinally taken along an optical axis, showing an arrangement of lens elements in an ultra wide angle imaging optical system of Example 3, specifically, a diagram showing a horizontal section i.e. the yz-section.
Figure 10:
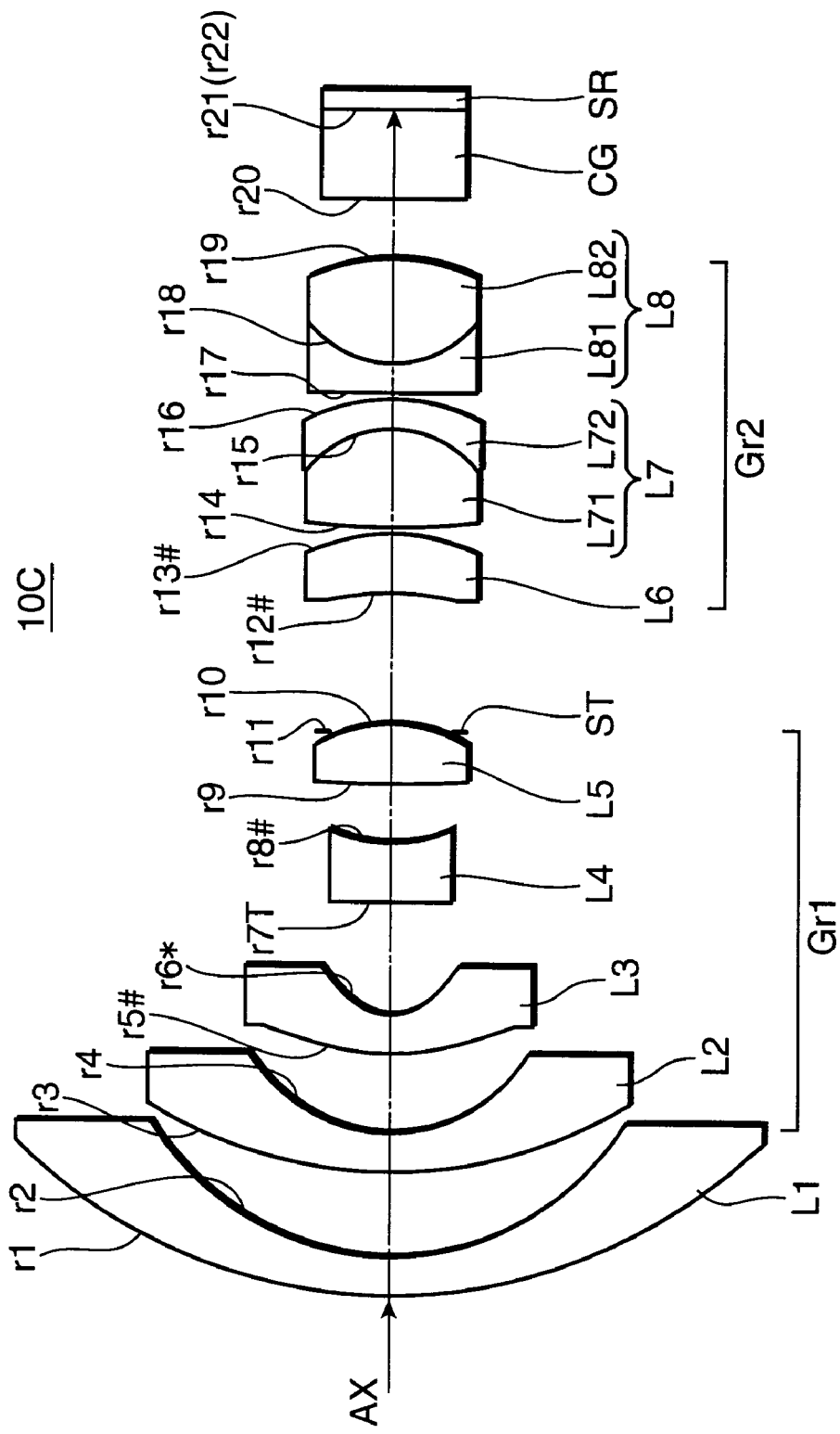
FIG. 10 is a cross-sectional view longitudinally taken along the optical axis, showing the arrangement of the lens elements in the ultra wide angle imaging optical system of Example 3, specifically, a diagram showing a vertical section i.e. the xz-section.

FIGS. 9 and 10 are cross-sectional views i.e. optical path diagrams longitudinally taken along the optical axis (AX), showing a lens arrangement in an ultra wide angle imaging optical system 10C of Example 3. FIG. 9 shows a horizontal section i.e. the yz-section, and FIG. 10 shows a vertical section i.e. the xz-section. The ultra wide angle imaging optical system 10C includes, from the object side in order, a first lens group (Gr1), an aperture stop (ST), a second lens group (Gr2), a cover glass (CG), and an image sensor (SR).

The first lens group (Gr1) is constituted of five lens elements in total, i.e., a negative meniscus lens element convex to the object side, as a first lens element (L1); a negative meniscus lens element convex to the object side, as a second lens element (L2); a negative lens element having an anamorphic aspherical surface on the object side, and an aspherical surface on the imaging side, as a third lens element (L3); a negative lens element having a toric aspherical surface on the object side and an anamorphic aspherical surface on the imaging side, as a fourth lens element (L4); and a biconvex positive lens element, as a fifth lens element (L5). The third lens element (L3) is a biconcave negative lens element with respect to the horizontal section, and is a negative meniscus lens element convex to the object side with respect to the vertical section. The fourth lens element (L4) is a negative lens element convex to the imaging side with respect to the horizontal section, and is a negative lens element having a flat surface on the object side with respect to the vertical section.

The second lens group (Gr2) is constituted of three lens elements in total, i.e., a positive lens element having an anamorphic aspherical surface on both surfaces thereof, as a sixth lens element (L6); a cemented lens element which is constituted of a biconvex positive lens element (L71) and a negative meniscus lens element (L72) convex to the imaging side, and which has a positive optical power as a whole, as a seventh lens element (L7); and a cemented lens element which is constituted of a negative lens element (L81) convex to the object side and a biconvex positive lens element (L82), and which has a positive optical power as a whole, as an eight lens element (L8). The sixth lens element (L6) is a positive meniscus lens element convex to the imaging side with respect to both the horizontal section and the vertical section.

Construction data on the respective lens elements in the ultra wide angle imaging optical system 10C of Example 3 are described in Tables 8, 9, 10, and 11. Table 12, which will be described later, shows numerical values of the elements in the aforementioned conditional formulae (1) through (3) in the case where the conditional formulae (1) through (3) are applied to the ultra wide angle imaging optical system 10C of Example 3.

TABLE 8

| lens surface | radius of curvature | axial distance between surfaces (mm) | refractive index | Abbe number |
|---|---|---|---|---|
| r1 | 19.400 | 1.300 | 1.785900 | 43.9296 |
| r2 | 10.037 | 2.852 | | |
| r3 | 16.848 | 1.311 | 1.785900 | 43.9296 |
| r4 | 5.892 | 2.685 | | |
| r5# | −26.515 | 1.300 | 1.525110 | 56.2216 |
| r6* | 1.911 | 3.800 | | |
| r7T | −1.557 | 2.000 | 1.525110 | 56.2216 |
| r8# | −10.954 | 2.000 | | |
| r9 | 53.358 | 2.000 | 1.785900 | 43.9296 |
| r10 | −5.35 | −0.242 | | |
| r11 (aperture stop) | ∞ | 4.626 | | |
| r12# | −24.638 | 2.000 | 1.525110 | 56.2216 |
| r13# | −6.700 | 0.200 | | |
| r14 | 28.089 | 3.300 | 1.589130 | 61.2401 |
| r15 | −4.000 | 1.000 | 1.846660 | 23.7826 |
| r16 | −7.011 | 0.200 | | |
| r17 | 309.659 | 1.000 | 1.846660 | 23.7826 |
| r18 | 3.950 | 3.500 | 1.516800 | 64.1988 |
| r19 | −7.278 | 2.000 | | |
| r20 | ∞ | 3.000 | 1.516800 | 64.2000 |
| r21 | ∞ | | | |
| r22 (imaging surface) | ∞ | 0.000 | | |

TABLE 9

| lens surface | conical coefficient | aspherical coefficient | | | |
|---|---|---|---|---|---|
| | | A | B | C | D |
| r6 | −0.9400 | 4.665E−03 | −1.484E−03 | −4.897E−04 | −5.721E−05 |

TABLE 10

| lens surface | conical coefficient | extended aspherical coefficient | | | |
|---|---|---|---|---|---|
| | | RDX | RDY | KX | KY |
| r5 | 0 | 9.283 | −26.52 | −0.1500 | −0.1500 |
| | | AR | BR | CR | DR |
| | | 1.399E−02 | −1.295E−04 | 5.604E−06 | −9.136E−08 |
| | | AP | BP | CP | DP |
| | | 0.6096 | 0.1043 | 7.954E−02 | 9.558E−02 |
| r8 | 0 | 6.436 | −10.95 | 0 | 0 |
| | | AR | BR | CR | DR |
| | | 6.266E−03 | 5.954E−04 | −2.740E−04 | 7.384E−05 |
| | | AP | BP | CP | DP |
| | | 0.3798 | −0.1153 | 3.420E−02 | 0.1150 |
| r12 | 0 | −10.47 | −24.64 | 0 | 0 |
| | | AR | BR | CR | DR |
| | | −6.779E−04 | 4.557E−05 | −1.205E−05 | 0 |
| | | AP | BP | CP | DP |
| | | 0.2577 | −0.8575 | −0.1728 | 0 |
| r13 | 0 | −6.216 | −6.700 | 0 | 0 |
| | | AR | BR | CR | DR |
| | | 9.047E−04 | −1.822E−05 | 2.435E−06 | −8.101E−07 |
| | | AP | BP | CP | DP |
| | | −0.2224 | 8.388E−02 | −0.7666 | −0.2180 |

TABLE 11

| lens surface | toric coefficient | | | |
|---|---|---|---|---|
| r7 | conical coefficient | RDX | RDY | |
| | 0 | ∞ | −1.557 | |
| | A | B | C | D |
| | −4.302E−04 | −3.316E−03 | 2.148E−03 | −2.821E−05 |

TABLE 12

|  | EX1 | EX2 | EX3 |
| --- | --- | --- | --- |
| fh: focal length in horizontal section | 0.84 | 0.81 | 0.85 |
| fv: focal length in vertical section | 1.67 | 1.65 | 1.67 |
| (Ph − Pv)*(fh + fv) L3 | −0.29284 | −0.23863 | −0.23748 |
| (Ph − Pv)*(fh + fv) L4 | −0.32408 | −0.47109 | −0.46984 |
| (Ph − Pv)*(fh + fv) L6 | 0.064571 | 0.038459 | 0.048806 |
| f1af/f1ar | −0.01285 | −0.36677 | −0.38102 |
| ff/fr | 0.733709 | 0.553113 | 0.54014 |
| fv/fh | 1.999775 | 2.040367 | 1.959005 |

Figure 13:
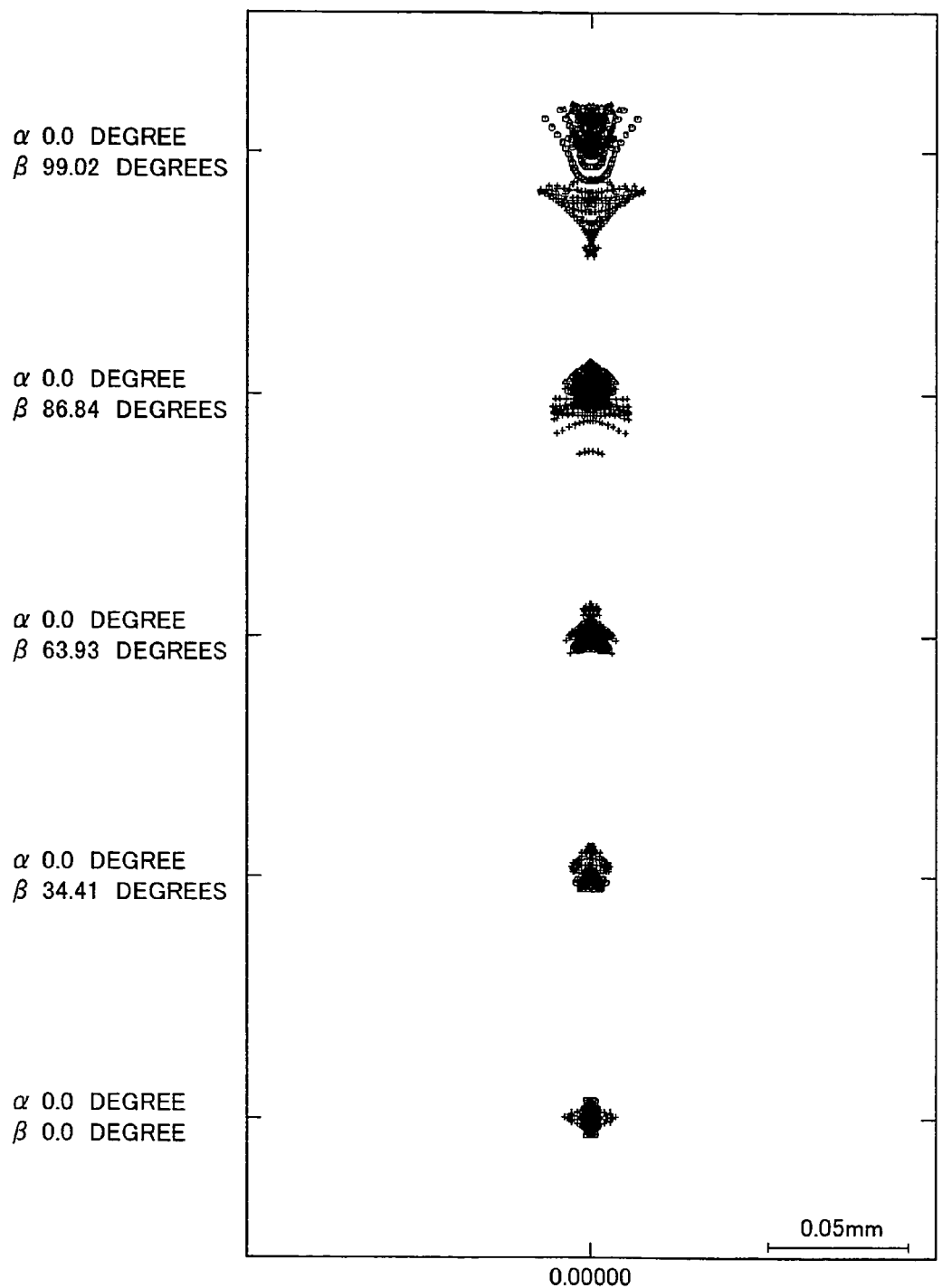
FIG. 13 is a spot diagram of the horizontal section i.e. the yz-section in Example 2.
Figure 14:
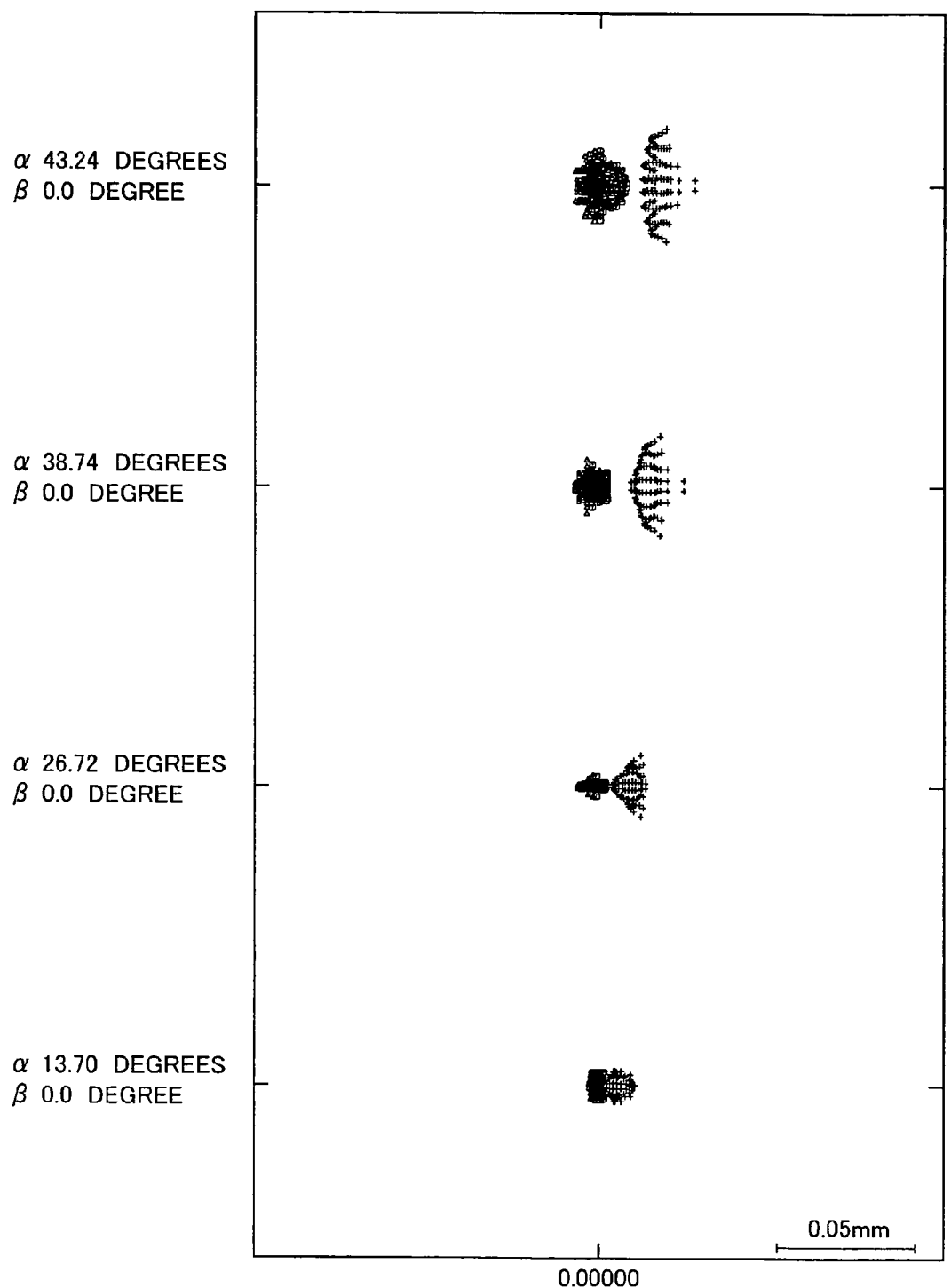
FIG. 14 is a spot diagram of the vertical section i.e. the xz-section in Example 2.
Figure 15:
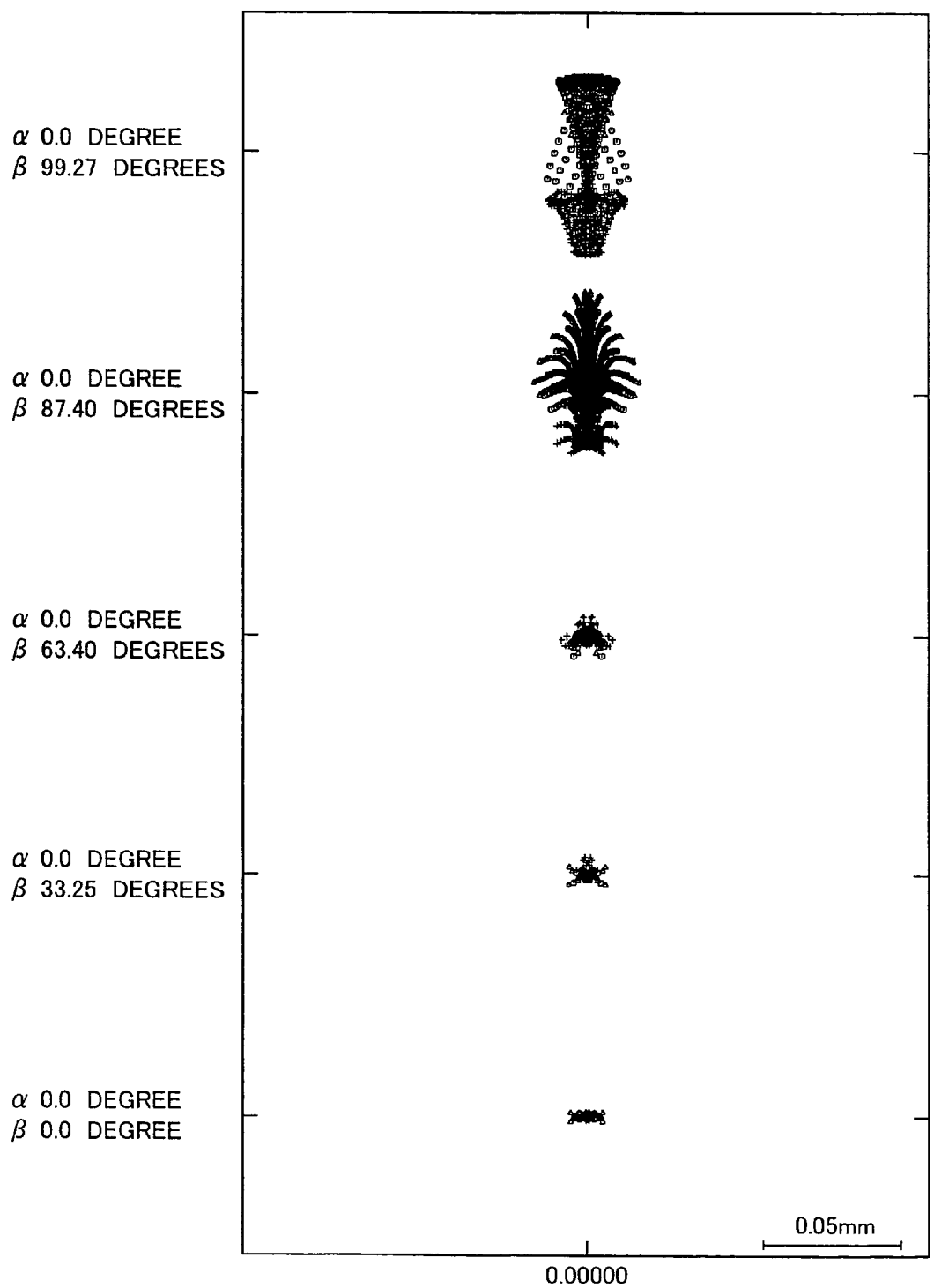
FIG. 15 is a spot diagram of the horizontal section i.e. the yz-section in Example 3.
Figure 16:
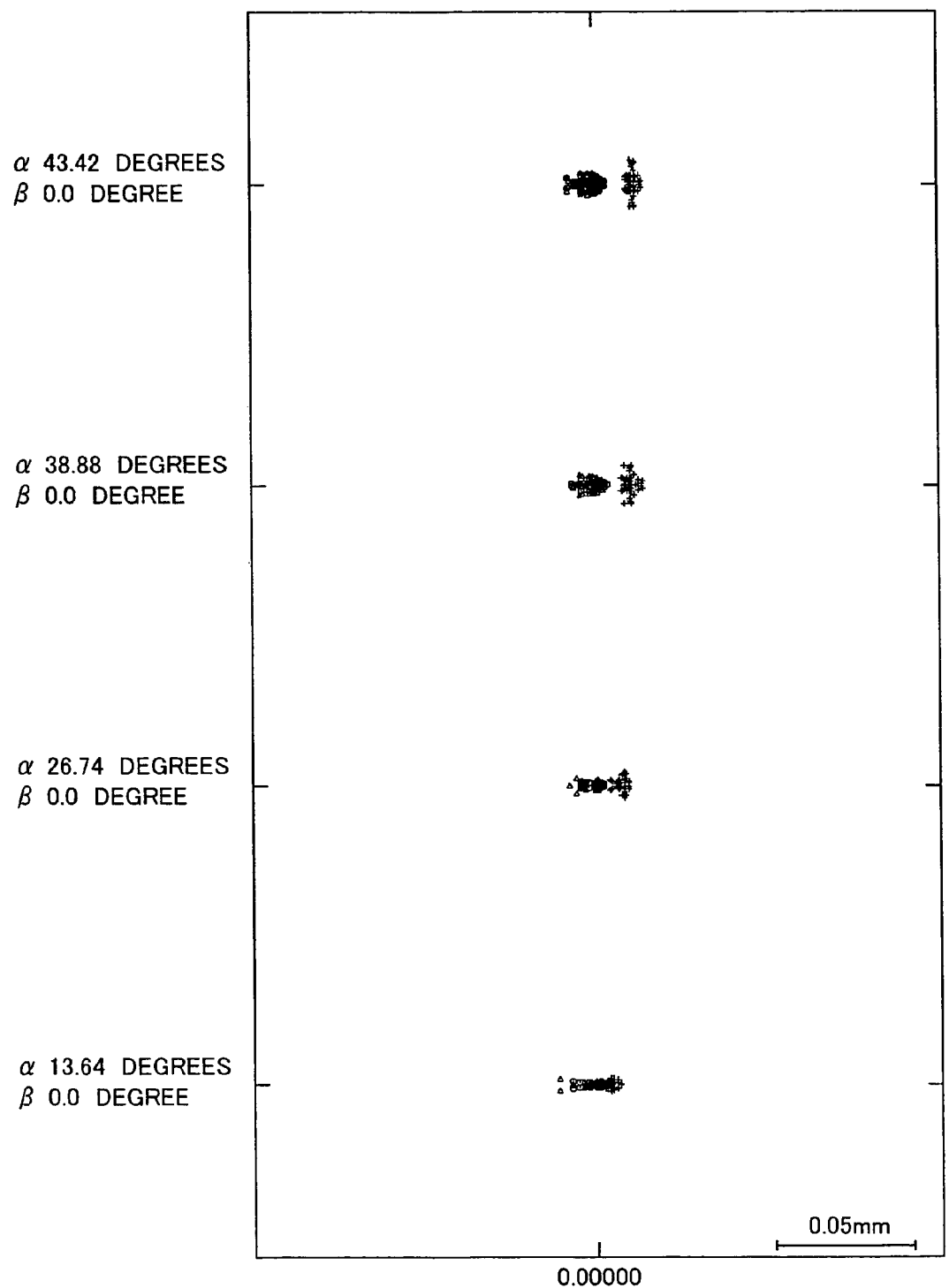
FIG. 16 is a spot diagram of the vertical section i.e. the xz-section in Example 3.

FIGS. 13 through 16 are spot diagrams showing imaging planes of the image sensors (SR) in the ultra wide angle imaging optical systems 10B and 10C of Examples 2 and 3 having the aforementioned lens arrangements and constructions, respectively. Specifically, concerning Example 2, FIG. 13 is a spot diagram with respect to the horizontal section i.e. the yz-section, and FIG. 14 is a spot diagram showing the vertical section i.e. the xz-section. Concerning Example 3, FIG. 15 is a spot diagram with respect to the horizontal section i.e. the yz-section, and FIG. 16 is a spot diagram showing the vertical section i.e. the xz-section. FIGS. 13 through 16 show that the ultra wide angle imaging optical systems 10B and 10C of Examples 2 and 3 each has a superior imaging performance. Tables 13 and 14 show focal lengths (unit: mm) and F-numbers with respect to the horizontal section and the vertical section in Examples 2 and 3, respectively. Tables 13 and 14 show that Examples 2 and 3 each provides a fast optical system as in the case of Example 1.

TABLE 13

| | focal length (mm) | |
| --- | --- | --- |
| | H | V |
| Example 1 | 0.84 | 1.67 |
| Example 2 | 0.81 | 1.65 |
| Example 3 | 0.85 | 1.67 |

TABLE 14

| | F-number | |
| --- | --- | --- |
| | H | V |
| Example 1 | 2.5 | 2.3 |
| Example 2 | 2.8 | 2.8 |
| Example 3 | 2.8 | 2.3 |

As mentioned above, the ultra wide angle imaging optical systems 10A, 10B, and 10C in Examples 1, 2, and 3 each has a superior optical performance. Thus, the inventors confirmed that the ultra wide angle imaging optical systems 10A, 10B, and 10C are suitable as an optical system capable of securing a wide angle in one direction i.e. a horizontal direction and yet suppressing an image distortion or a like disadvantage, which is required to be loaded in a car-mounted camera, a security camera, or a like device.

The aforementioned embodiment essentially includes the invention having the following arrangements.

An aspect of the invention is directed to an ultra wide angle imaging optical system comprising, in order from an object side, a first lens group, an aperture stop, and a second lens group. The first lens group includes, in order from a position closest to the object side, a negative meniscus lens element convex to the object side, a negative lens element, and a negative lens element. The second lens group includes a plurality of positive lens elements. The first lens group and the second lens group each includes at least one anamorphic surface having different optical powers with respect to a first section extending in a first direction on a flat plane substantially orthogonal to an optical axis, and with respect to a second section extending in a second direction substantially orthogonal to the first direction. The first lens group includes the lens element satisfying the following conditional formula (1):

$$-0.6 < (Ph-Pv)*(fh+fv) < -0.1 \quad (1)$$

where

Ph: an optical power in the first direction where a viewing angle is large;

Pv: an optical power in the second direction where the viewing angle is small;

fh: a focal length in the first direction with respect to the entirety of the optical system; and fv: a focal length in the second direction with respect to the entirety of the optical system.

According to the above arrangement, the first lens group includes, in order from the position closest to the object side, the negative meniscus lens element convex to the object side, the negative lens element, and the negative lens element. With this arrangement, the negative optical power of the first lens group arranged on the object side can be split in such a manner that light incident with an ultra wide angle can be gradually refracted in a direction perpendicular to an imaging plane, with use of the three negative lens elements. This enables to reduce a field curvature aberration or an astigmatism. Also, since the surface of the lens element closest to the object side is convex to the object side, there can be prevented unduly large refraction of an off-axial ray with an ultra wide incident angle on the first lens surface. This also enables to reduce a field curvature aberration or an astigmatism. Further, the negative lens elements are disposed in the first lens group, and the positive lens elements are disposed in the second lens group, respectively, which enables to secure an optical power arrangement substantially equivalent to a retro-focus arrangement. Thus, a sufficient back focus adjustment can be secured in the optical system having an ultra wide angle and a short focal length.

In the above arrangement, at least one or more anamorphic surface is provided in each of the first lens group and the second lens group. This enables to make the focal positions in the first direction corresponding to a horizontal direction and the second direction corresponding to a vertical direction substantially identical to each other by changing the focal length according to a direction in e.g. a car-mounted camera in such a manner that the focal length is reduced in the horizontal direction where a wide viewing angle is required and that the focal length is increased in the vertical direction where a wide viewing angle is not required.

Furthermore, by satisfying the conditional formula (1), the viewing angles in the directions orthogonal to each other can be optimized on the flat plane substantially orthogonal to the optical axis, and an ultra wide angle imaging optical system having desirable optical characteristics can be provided. If the value of the element of the conditional formula (1) is under the lower limit in the conditional formula (1), a difference in focal length between the first direction and the second direction is unduly increased. Accordingly, if a wide viewing angle is provided in the first direction, for instance, the optical power of the lens elements in the first direction is unduly increased, which makes it difficult to correct a field curvature or an astigmatism in the first direction. On the other hand, if the value of the element of the conditional formula (1) is over the upper limit in the conditional formula (1), a difference in focal length between the first direction and the second direction is unduly decreased. Accordingly, if a sufficiently wide viewing angle is provided in the first direction, for instance, the viewing angle in the second direction may likely to be unduly increased.

Preferably, at least one or more of the surface having the different optical powers with respect to the first section and the second section may be formed into an aspherical shape both with respect to the first section and the second section.

In the above arrangement, since the anamorphic surface is provided both in the first section and the second section, a compact optical system can be realized, while securing a high optical performance both with respect to the first section and the second section. Examples of the surface whose optical powers are different with respect to the first section and the second section are a cylindrical surface, wherein, for instance, the first section is spherical or aspherical, and the second section is flat; or a toric surface, wherein, for instance, the first section is spherical or aspherical, and the second section is a spherical surface having different curvatures. The cylindrical surface or the toric surface, however, has a flat surface or a spherical surface with respect to the first section or the second section. This may fail to provide sufficient aberration correction, or sufficiently high optical performance in an optical system with a wide viewing angle, or may result in production of an undesirably large imaging optical system. Unlike the cylindrical surface or the toric surface, forming both the first section and the second section into the aspherical shape enables to provide sufficient aberration correction, and to make the imaging optical system compact.

Preferably, the negative meniscus lens element, in the first lens group, closest to the object side may be a glass lens element having a spherical surface.

Generally, in an ultra wide angle imaging optical system, the first lens element i.e. the negative meniscus lens element closest to the object side has a largest diameter among the lens elements constituting the ultra wide angle imaging optical system. Forming the first lens element having such a large diameter into an aspherical shape increases the production cost of the first lens element. Also, use of a plastic lens element as the first lens element fails to maintain sufficient durability when the optical system is adapted to monitor the exterior or to be mounted in an automobile, which is a primary usage of the ultra wide angle imaging optical system. In view of this, using the glass lens element having the spherical surface as the first lens element closest to the object side enables to reduce the production cost of the optical system and to secure durability of the optical system.

Preferably, the lens element having the surface whose optical powers are different with respect to the first section and the second section may be a lens element made of a resin material, and the ultra wide angle imaging optical system may include at least the one resin lens element having a negative optical power, and at least the one resin lens element having a positive optical power.

The above arrangement enables to suppress the production cost of the lens element having the anamorphic surface and to suppress a variation in optical performance due to a change in ambient temperature in use. Specifically, since the anamorphic surface has a unique surface configuration, glass molding may likely to increase the processing or molding cost. Use of a resin lens element as the lens element having the anamorphic surface lowers the production cost of the lens element. However, generally, the resin material has a larger change in surface configuration or in refractive index due to a change in temperature, as compared with a glass material. Accordingly, a variation in optical performance of the imaging optical system i.e. shifting of the focal position or variation in field curvature may be unduly increased if the ambient temperature is changed. In view of this, at least one each of the resin lens element having a negative optical power and the resin lens element having a positive optical power are included in the ultra wide angle imaging optical system so that the focal position shifting or the field curvature variation due to the temperature change can be cancelled by the lens elements having the negative and positive powers. This enables to reduce the performance variation with respect to the entirety of the optical system even if the ambient temperature in use is changed.

Preferably, the ultra wide angle imaging optical system may satisfy the following conditional formula (2):

$$1.7 < fv/fh < 3.0 \tag{2}$$

If the value of the element in the conditional formula (2) is under the lower limit in the conditional formula (2), a difference in focal length with respect to the first direction and the second direction is unduly decreased. For instance, if a sufficiently wide viewing angle is provided in the first direction, the viewing angle in the second direction may likely to be unduly increased. On the other hand, if the value of the element of the conditional formula (2) is over the upper limit in the conditional formula (2), a difference in focal length with respect to the first direction and the second direction is unduly increased. In such a condition, the optical power of the lens elements in the direction where the sufficiently wide viewing angle is provided is unduly increased, which makes it difficult to correct a field curvature or an astigmatism in the corresponding direction.

Preferably, at least one each of the lens elements in the first lens group and in the second lens group may be a lens element made of a resin material, and the ultra wide angle imaging optical system may satisfy the following conditional formula (3):

$$-0.5 < f_{1af}/f_{1ar} < 0.0 \tag{3}$$

where $f_{1af}$: a focal length of the resin lens element closest to the aperture stop in the first lens group, or an average of focal lengths of the first section and the second section if the lens element has the different focal lengths with respect to the first section and the second section; and $f_{1ar}$: a focal length of the resin lens element closest to the aperture stop in the second lens group, or an average of focal lengths of the first section and the second section if the lens element has the different focal lengths with respect to the first section and the second section.

If the value of the element in the conditional formula (3) is under the lower limit in the conditional formula (3), the focal length of the resin lens element closer to the imaging side with respect to the aperture stop is unduly decreased, which makes it difficult to correct a spherical aberration or a field curvature with respect to the corresponding section. On the other hand, if the value of the element in the conditional formula (3) is over the upper limit in the conditional formula (3), the optical powers of the resin lens elements which are disposed opposite to each other with respect to the aperture stop have identical signs, in other words, the optical powers of the opposing resin lens elements are both positive or negative. This may cause intolerable displacement concerning an optical power arrangement substantially equivalent to a retro-focus arrangement, which may make it difficult to secure a desirable back focus adjustment.

Another aspect of the invention is directed to an ultra wide angle imaging lens device comprising the ultra wide angle imaging optical system, and an image sensor for converting an optical image of an object into an electrical signal, wherein the ultra wide angle imaging optical system is so configured as to form the optical image of the object onto a light receiving plane of the image sensor. According to this arrangement, the ultra wide angle imaging lens device can be desirably used in a car-mounted camera, a securing camera, or a like device. This arrangement enables to realize an ultra wide angle imaging lens device having a wide viewing angle in a specific direction, and a superior optical performance.

Yet another aspect of the invention is directed to an image sensing apparatus comprising the ultra wide angle imaging lens device, and a controller for controlling the ultra wide angle imaging lens device and the image sensor to execute a photographing operation of the object. This arrangement enables to provide an image sensing apparatus which has an ultra wide angle imaging lens device with a wide viewing angle in a specific direction, and a superior optical performance, and which is desirably adapted to be mounted in an automobile or to monitor an area.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An ultra wide angle imaging optical system comprising, in order from an object side:
    a first lens group;
    an aperture stop; and
    a second lens group,
    the first lens group including, in order from a position closest to the object side, a negative meniscus lens element convex to the object side, a negative lens element, and a negative lens element,
    the second lens group including a plurality of positive lens elements,
    the first lens group and the second lens group each including at least one anamorphic surface having different optical powers with respect to a first section extending in a first direction on a flat plane substantially orthogonal to an optical axis, and with respect to a second section extending in a second direction substantially orthogonal to the first direction, and
    the first lens group including the lens element satisfying the following conditional formula (1):

$$-0.6 < (Ph-Pv)*(fh+fv) < -0.1 \quad (1)$$

where
    Ph: an optical power in the first direction where a viewing angle is large;
    Pv: an optical power in the second direction where the viewing angle is small;
    fh: a focal length in the first direction with respect to the entirety of the optical system; and
    fv: a focal length in the second direction with respect to the entirety of the optical system.

2. The ultra wide angle imaging optical system according to claim 1, wherein
    at least one or more of the surface having the different optical powers with respect to the first section and the second section is formed into an aspherical shape both with respect to the first section and the second section.

3. The ultra wide angle imaging optical system according to claim 1, wherein
    the negative meniscus lens element, in the first lens group, closest to the object side is a glass lens element having a spherical surface.

4. The ultra wide angle imaging optical system according to claim 1, wherein
    the lens element having the surface whose optical powers are different with respect to the first section and the second section is a lens element made of a resin material, and
    the ultra wide angle imaging optical system includes at least the one resin lens element having a negative optical power, and at least the one resin lens element having a positive optical power.

5. The ultra wide angle imaging optical system according to claim 1, wherein
    the ultra wide angle imaging optical system satisfies the following conditional formula (2):

$$1.7 < fv/fh < 3.0 \quad (2).$$

6. The ultra wide angle imaging optical system according to claim 1, wherein
    at least one each of the lens elements in the first lens group and in the second lens group is a lens element made of a resin material, and
    the ultra wide angle imaging optical system satisfies the following conditional formula (3):

$$-0.5 < f_{1af}/f_{1ar} < 0.0 \quad (3)$$

where
    $f_{1af}$: a focal length of the resin lens element closest to the aperture stop in the first lens group, or an average of focal lengths of the first section and the second section if the lens element has the different focal lengths with respect to the first section and the second section; and
    $f_{1ar}$: a focal length of the resin lens element closest to the aperture stop in the second lens group, or an average of focal lengths of the first section and the second section if the lens element has the different focal lengths with respect to the first section and the second section.

7. An ultra wide angle imaging lens device comprising:
    a) an ultra wide angle imaging optical system including, in order from an object side,
        a first lens group,
        an aperture stop, and
        a second lens group,
        the first lens group including, in order from a position closest to the object side, a negative meniscus lens element convex to the object side, a negative lens element, and a negative lens element,
        the second lens group including a plurality of positive lens elements,
        the first lens group and the second lens group each including at least one anamorphic surface having different optical powers with respect to a first section extending in a first direction on a flat plane substantially orthogonal to an optical axis, and with respect to a second section extending in a second direction substantially orthogonal to the first direction, and
        the first lens group including the lens element satisfying the following conditional formula (1):

$$-0.6 < (Ph-Pv)*(fh+fv) < -0.1 \quad (1)$$

where
- Ph: an optical power in the first direction where a viewing angle is large;
- Pv: an optical power in the second direction where the viewing angle is small;
- fh: a focal length in the first direction with respect to the entirety of the optical system; and
- fv: a focal length in the second direction with respect to the entirety of the optical system; and b) an image sensor for converting an optical image of an object into electrical signals, wherein
the ultra wide angle imaging optical system is so configured as to form the optical image of the object onto a light receiving plane of the image sensor.

8. The ultra wide angle imaging lens device according to claim 7, wherein
in the ultra wide angle imaging optical system, at least one or more of the surface having the different optical powers with respect to the first section and the second section is formed into an aspherical shape both with respect to the first section and the second section.

9. An image sensing apparatus comprising:
a) an ultra wide angle imaging lens device including
  a1) an ultra wide angle imaging optical system including, in order from an object side,
    a first lens group,
    an aperture stop, and
    a second lens group,
    the first lens group including, in order from a position closest to the object side, a negative meniscus lens element convex to the object side, a negative lens element, and a negative lens element,
    the second lens group including a plurality of positive lens elements,
    the first lens group and the second lens group each including at least one anamorphic surface having different optical powers with respect to a first section extending in a first direction on a flat plane substantially orthogonal to an optical axis, and with respect to a second section extending in a second direction substantially orthogonal to the first direction, and
    the first lens group including the lens element satisfying the following conditional formula (1):

$$-0.6 < (Ph-Pv)*(fh+fv) < -0.1 \tag{1}$$

where
- Ph: an optical power in the first direction where a viewing angle is large;
- Pv: an optical power in the second direction where the viewing angle is small;
- fh: a focal length in the first direction with respect to the entirety of the optical system; and
- fv: a focal length in the second direction with respect to the entirety of the optical system; and a2) an image sensor for converting an optical image of an object into electrical signals,
the ultra wide angle imaging optical system being so configured as to form the optical image of the object onto a light receiving plane of the image sensor; and b) a controller for controlling the ultra wide angle imaging lens device and the image sensor to execute a photographing operation of the object.

10. The image sensing apparatus according to claim 9, wherein
the ultra wide angle imaging optical system satisfies the following conditional formula (2):

$$1.7 < fv/fh < 3.0 \tag{2}$$

* * * * *